(12) United States Patent
Lee et al.

(10) Patent No.: US 12,533,655 B2
(45) Date of Patent: Jan. 27, 2026

(54) SUPER ABSORBENT POLYMER

(71) Applicant: LG Chem, Ltd., Seoul (KR)

(72) Inventors: Dae Woong Lee, Daejeon (KR); Sang Won Han, Daejeon (KR); Min Goo Jee, Daejeon (KR); Jun Wye Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 18/968,057

(22) Filed: Dec. 4, 2024

(65) Prior Publication Data

US 2025/0325957 A1     Oct. 23, 2025

(30) Foreign Application Priority Data

Apr. 17, 2024   (KR) .................. 10-2024-0051625

(51) Int. Cl.
*B01J 20/26*      (2006.01)
*C08F 220/06*     (2006.01)

(52) U.S. Cl.
CPC .......... *B01J 20/261* (2013.01); *C08F 220/06* (2013.01)

(58) Field of Classification Search
CPC .............................. C08F 220/06; B01J 20/261
See application file for complete search history.

(56) References Cited

U.S. PATENT DOCUMENTS

| | | | |
|---|---|---|---|
| 5,338,766 A | 8/1994 | Phan et al. | |
| 6,319,558 B1 | 11/2001 | Willemsen | |
| 10,994,260 B2 | 5/2021 | Kovacic et al. | |
| 2005/0003191 A1 | 1/2005 | Ehrnsperger et al. | |
| 2005/0239942 A1 | 10/2005 | Herfert et al. | |
| 2006/0020053 A1 | 1/2006 | Flohr et al. | |
| 2007/0264489 A1 | 11/2007 | Sasabe et al. | |

(Continued)

FOREIGN PATENT DOCUMENTS

| CA | 2319786 A1 | 8/1999 |
|---|---|---|
| CN | 001136355 C | 1/2004 |

(Continued)

OTHER PUBLICATIONS

Shi, M. et al., "The Development of a Polysaccharide-Based Hydrogel Encapsulating Tobramycin-Loaded Gelatine Microspheres as an Antibacterial System" gels, MDPI, Mar. 2023, pp. 1-15, vol. 9, No. 3.

(Continued)

*Primary Examiner* — Vu A Nguyen
(74) *Attorney, Agent, or Firm* — Lerner David LLP

(57) ABSTRACT

A polyacrylic acid (salt)-based super absorbent polymer has a slip strain (%) of 12.5% or less after the polyacrylic acid (salt)-based super absorbent polymer is subjected to 30% swelling. The slip strain means a value at a time when a storage modulus rapidly decreases with an increase in strain when a change in the storage modulus is observed by increasing the slip strain of each sample from 0.01% to 100% using a rheometer under a frequency of 1 Hz and a temperature of 25° C. The superabsorbent polymer has an absolute value of a rate of change in slip strain at 30% and 70% swelling derived by Equation 1 of 0.04 or less, wherein Equation 1 is Rate of change in slip strain at 30% and 70% swelling=[{(slip strain at 70% swelling)−(slip strain at 30% swelling)}/40].

12 Claims, 1 Drawing Sheet

(56) References Cited

U.S. PATENT DOCUMENTS

| | | |
|---|---|---|
| 2008/0021150 A1 | 1/2008 | Becker et al. |
| 2008/0075937 A1 | 3/2008 | Wada et al. |
| 2008/0140037 A1 | 6/2008 | Newman |
| 2010/0216938 A1 | 8/2010 | Becker et al. |
| 2012/0220452 A1 | 8/2012 | Matsumoto et al. |
| 2013/0026412 A1 | 1/2013 | Machida et al. |
| 2013/0102750 A1 | 4/2013 | Watanabe et al. |
| 2013/0136713 A1 | 5/2013 | Terada et al. |
| 2013/0175473 A1 | 7/2013 | Wada et al. |
| 2014/0031203 A1 | 1/2014 | Kondo et al. |
| 2014/0031473 A1 | 1/2014 | Nogi et al. |
| 2015/0299404 A1 | 10/2015 | Daniel et al. |
| 2015/0307681 A1 | 10/2015 | Park et al. |
| 2016/0208035 A1 | 7/2016 | Ryu et al. |
| 2017/0014801 A1 | 1/2017 | Ikeuchi et al. |
| 2017/0073478 A1 | 3/2017 | Joo et al. |
| 2017/0233534 A1 | 8/2017 | Kim et al. |
| 2017/0312148 A1 | 11/2017 | Dobrosielska-Oura et al. |
| 2018/0021437 A1 | 1/2018 | Kim et al. |
| 2018/0037686 A1 | 2/2018 | Lee et al. |
| 2018/0243464 A1 | 8/2018 | Hwang et al. |
| 2019/0099739 A1 | 4/2019 | Lee et al. |
| 2019/0308171 A1 | 10/2019 | Kim et al. |
| 2020/0085716 A1 | 3/2020 | Mehling et al. |
| 2020/0139344 A1 | 5/2020 | Kim et al. |
| 2020/0247958 A1 | 8/2020 | Park et al. |
| 2021/0033516 A1 | 2/2021 | Toennessen et al. |
| 2021/0113989 A1 | 4/2021 | Hur et al. |
| 2021/0121852 A1 | 4/2021 | Herfert et al. |
| 2021/0154637 A1 | 5/2021 | Pfeiffer et al. |
| 2021/0244844 A1 | 8/2021 | Chan et al. |
| 2021/0309777 A1 | 10/2021 | Lee et al. |
| 2021/0362126 A1 | 11/2021 | Bauer et al. |
| 2022/0088568 A1 | 3/2022 | Kimura et al. |
| 2023/0102961 A1 | 3/2023 | Nishimura et al. |
| 2023/0338925 A1 | 10/2023 | Chung et al. |
| 2023/0347317 A1 | 11/2023 | Yoon et al. |
| 2023/0374232 A1 | 11/2023 | Ryu et al. |
| 2023/0381744 A1 | 11/2023 | Woo et al. |
| 2024/0238759 A1 | 7/2024 | Ryu et al. |
| 2024/0261762 A1 | 8/2024 | Kim et al. |
| 2024/0278211 A1* | 8/2024 | Han .................... C08F 2/01 |

FOREIGN PATENT DOCUMENTS

| | | |
|---|---|---|
| EP | 1024176 A1 | 8/2000 |
| EP | 4253451 A1 | 10/2023 |
| EP | 4321561 A1 | 2/2024 |
| JP | H08122284 A | 5/1996 |
| JP | 2001106728 A | 4/2001 |
| JP | 2002504568 A | 2/2002 |
| JP | 2005097569 A | 4/2005 |
| JP | 3745539 B2 | 2/2006 |
| JP | 2006527641 A | 12/2006 |
| JP | 2007512405 A | 5/2007 |
| JP | 2009057496 A | 3/2009 |
| JP | 4261853 B2 | 4/2009 |
| JP | 4284767 B2 | 6/2009 |
| JP | 4908545 B2 | 4/2012 |
| JP | 2012097273 A | 5/2012 |
| JP | WO2012144564 A1 | 7/2014 |
| JP | 5616437 B2 | 10/2014 |
| JP | 5692844 B2 | 4/2015 |
| JP | 2015120933 A | 7/2015 |
| JP | 5913423 B2 | 4/2016 |
| JP | 2017185485 A | 10/2017 |
| JP | 2017531531 A | 10/2017 |
| JP | 2018510041 A | 4/2018 |
| JP | 2021510320 A | 4/2021 |
| JP | 6950158 B2 | 10/2021 |
| JP | 6959030 B2 | 11/2021 |
| JP | 7181948 B2 | 12/2022 |
| JP | 7270828 B2 | 5/2023 |
| JP | 7362653 B2 | 10/2023 |
| KR | 100317398 B1 | 11/2002 |
| KR | 20050036974 A | 4/2005 |
| KR | 20070039050 A | 4/2007 |
| KR | 20070048226 A | 5/2007 |
| KR | 20070083761 A | 8/2007 |
| KR | 20130097771 A | 9/2013 |
| KR | 20140063116 A | 5/2014 |
| KR | 20150062959 A | 6/2015 |
| KR | 20150087368 A | 7/2015 |
| KR | 20150143181 A | 12/2015 |
| KR | 20160127742 A | 11/2016 |
| KR | 101700354 B1 | 1/2017 |
| KR | 20170020113 A | 2/2017 |
| KR | 20170033634 A | 3/2017 |
| KR | 20170111295 A | 10/2017 |
| KR | 101848470 B1 | 4/2018 |
| KR | 20180073334 A | 7/2018 |
| KR | 20180074384 A | 7/2018 |
| KR | 101908142 B1 | 10/2018 |
| KR | 101918647 B1 | 11/2018 |
| KR | 20190012809 A | 2/2019 |
| KR | 20190016534 A | 2/2019 |
| KR | 101989142 B1 | 6/2019 |
| KR | 102094453 B1 | 3/2020 |
| KR | 20200051565 A | 5/2020 |
| KR | 20200123127 A | 10/2020 |
| KR | 102322774 B1 | 11/2021 |
| KR | 20220049961 A | 4/2022 |
| KR | 20220088351 A | 6/2022 |
| KR | 20220169431 A | 12/2022 |
| KR | 20220169444 A | 12/2022 |
| KR | 102568226 B1 | 8/2023 |
| KR | 20230120110 A | 8/2023 |
| KR | 102578740 B1 | 9/2023 |
| KR | 102584470 B1 | 10/2023 |
| KR | 20240014710 A | 2/2024 |
| WO | 2022131838 A1 | 6/2022 |
| WO | 2022265459 A1 | 12/2022 |
| WO | 2022265466 A1 | 12/2022 |
| WO | 2022265473 A1 | 12/2022 |
| WO | 2022265477 A1 | 12/2022 |
| WO | WO-2022265472 A1 * | 12/2022 ............ B01J 20/267 |

OTHER PUBLICATIONS

Zhang, S. et al., "Predicting the Swelling Behavior of Acrylic Superabsorbent Polymers Used in Diapers" Willey Hindawi, Advances in Polymer Technology, Dec. 2021, pp. 1-7, vol. 2021.

International Search Report for Application No. PCT/KR2024/018688 mailed Mar. 7, 2025. 5 pages.

International Search Report for Application No. PCT/KR2024/018689 mailed Mar. 7, 2025. 5 pages.

Kim, S., et al. Preparation of Surface-Reinforced Superabsorbent Polymer Hydrogel Microspheres via Incorporation of In Situ Synthesized Silver Nanoparticles. Polymers. Mar. 2021; 13(6):902. https://doi.org/10.3390/polym13060902.11 pgs.

Situ, Y, et al., "Synthesis and application of super absorbent polymers synthesized with ammonia solution and diatomaceous earth with low toxic residues" Environmental Technology & Innovation, Oct. 2023, pp. 1-12, vol. 32.

Kwon, Y.R."Surface-crosslinking of itaconic acid-based superabsorbent polymer using a novel bio-based surface-crosslinker based on succinic acid"Polymer-Plastics Technology and Materials, Taylor & Francis, Mar. 2023, pp. 1057-1066, vol. 62, Issue 8.

Sharma, S. et al., " Superabsorbent Polymer Gels based on Polyaspartic Acid and Polyacrylic Acid" Journal of Material Science & Engineering, Feb. 2016, pp. 1-7, vol. 5, Issue 3.

International Search Report for Application No. PCT/KR2025/006678 mailed Aug. 29, 2025, 11 pages.

International Search Report for Application No. PCT/KR2025/006025 mailed Aug. 6, 2025, 13 pages.

International Search Report for Application No. PCT/KR2025/006542 mailed Aug. 27, 2025, 9 pages.

(56) References Cited

OTHER PUBLICATIONS

International Search Report for Application No. PCT/KR2025/006675 mailed Aug. 27, 2025, 9 pages.

* cited by examiner

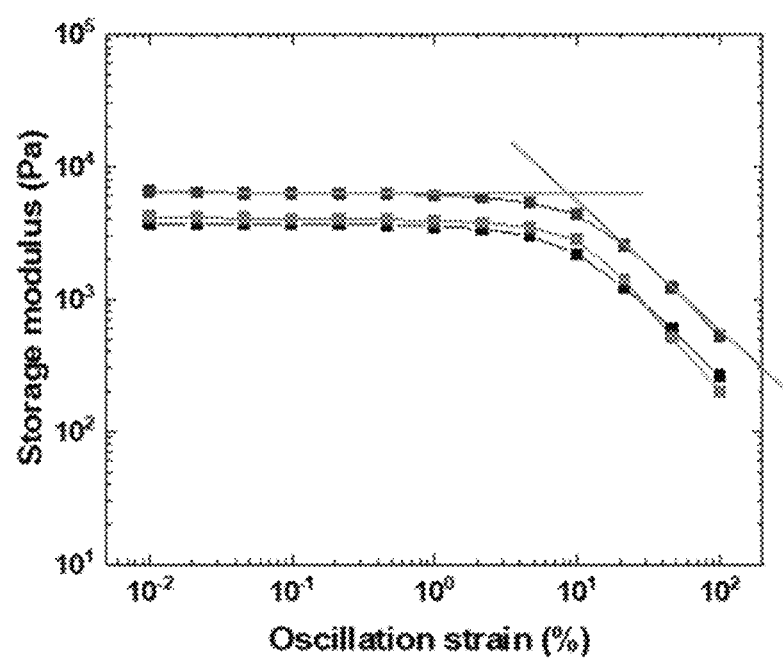

SUPER ABSORBENT POLYMER

CROSS-REFERENCE TO RELATED APPLICATION

This application claims priority to Korean Patent Application No. 10-2024-0051625 filed on Apr. 17, 2024, the content of which is incorporated by reference in its entirety.

BACKGROUND

The present disclosure herein relates to a super absorbent polymer exhibiting an improved absorption rate and absorption performance.

A super absorbent polymer (SAP) is a synthetic polymer material which has the ability to absorb moisture 500 times to 1,000 times its own weight, and is given different names, such as a super absorbency material (SAM) and an absorbent gel material (AGM), by each developer. The above-described super absorbent polymer was first put into practical use in diapers, hygiene products, and the like, and is now widely used as a material for soil repair agents for horticulture, a civil engineering work, a construction index material, a seedling sheet, a freshness maintaining agent in a food distribution field, and a fomentation.

The super absorbent polymer is generally included in a dispersed state in pulp. However, in recent years, in order to provide thinner products, the development of products with a reduced content of pulp, or furthermore, with no pulp, such as so-called pulpless products, is actively in progress.

As a result, a super absorbent polymer is included at a relatively high ratio in a product, and super absorbent polymer particles are inevitably included in multiple layers in the product. In addition, in order to allow a super absorbent polymer to absorb a large amount of liquids, such as water, brine, and urine, it is necessary to increase absorption physical properties of the super absorbent polymer such that the super absorbent polymer has a fast absorption rate as well as high absorption performance.

That is, a super absorbent polymer may have high capability of absorbing moisture (centrifuge retention capacity, CRC), not to allow once absorbed moisture from easily escaping even when a pressure is applied thereto (absorbency under pressure, AUP), and to also have excellent permeability such that the entire polymer absorbs water well, not just a portion thereof which comes into direct contact with the water.

To this end, a method is generally used, wherein cross-linking polymerization is performed by including a foaming agent in a monomer composition, thereby forming a porous structure in base resin powder to increase the surface area of a super absorbent polymer.

However, there has been a problem in that overall physical properties of the super absorbent polymer, for example, surface tension, permeability, volume density, and the like, are degraded due to the use of the foaming agent. That is, there has been a problem in that it is difficult to maintain the shape of the super absorbent polymer in a swollen state. In addition, there has been a disadvantage in that the amount of generation of fine powder increases.

On the contrary, if the cross-linking density of a super absorbent polymer is controlled to be high in order to improve the permeability of the super absorbent polymer, it is difficult for moisture to be absorbed through a dense cross-linked structure, so that there is a problem in that the centrifuge retention capacity, which is one of basic physical properties of the super absorbent polymer, is degraded.

Therefore, it is not easy to develop a super absorbent polymer excellent in all of the above-described physical properties, such as centrifuge retention capacity, permeability, and absorption rate, in a balanced manner, so that research for improving physical properties of a super absorbent polymer has been continuously requested.

SUMMARY

The present disclosure provides a super absorbent polymer having improved absorption physical properties by adjusting the change in slip strain according to the degree of swelling of the super absorbent polymer (SAP) to be constant. Particularly, the present disclosure provides a super absorbent polymer excellent in permeability and absorption rate.

In accordance with an aspect of the present disclosure, there is provided a polyacrylic acid (salt)-based super absorbent polymer having a slip strain (%) of 12.5% or less after the super absorbent polymer has been subjected to 30% swelling, wherein an absolute value of the rate of change in slip strain at 30% and 70% swelling derived by Equation 1 below is 0.04 or less.

Rate of change in slip strain at 30% and 70% swelling=[{(slip strain at 70% swelling)−(slip strain at 30% swelling)}/40]  [Equation 1]

The slip strain means a value at the time when a storage modulus rapidly decreases with an increase in strain when the change in the storage modulus is observed by increasing the strain of each sample from 0.01% to 100% using a rheometer under a frequency of 1 Hz and a temperature of 25° C.

BRIEF DESCRIPTION OF THE DRAWINGS

Exemplary aspects can be understood in more detail from the following description taken in conjunction with the accompanying drawing, in which:

The FIGURE is a graph for describing a process of deriving a slip strain of a super absorbent polymer.

DETAILED DESCRIPTION

Unless otherwise defined herein, all technical and scientific terms are used to describe illustrative aspects only and are not intended to limit the present disclosure. Singular expressions include plural expressions unless the context clearly indicates otherwise. In the present specification, it should be understood that the term "include," "comprise," or "have" is intended to specify the presence of stated features, numbers, steps, elements, or combinations thereof, but do not preclude the presence or addition of one or more other features, numbers, steps, elements, or combinations thereof.

The present disclosure may be modified in various ways and may take many forms, and specific aspects are illustrated and described in detail below. It should be understood, however, that it is not intended to limit the present disclosure to the particular forms disclosed, but rather, is intended to cover all modifications, equivalents, and alternatives falling within the spirit and scope of the above ideas and techniques.

The terminology used herein is for reference only to particular implementations, and is not intended to limit the present disclosure. In addition, the singular forms used herein include plural forms, unless the phrases clearly indicate the opposite meaning.

The term "polymer" or "polymer" as used in the present disclosure means that a water-soluble ethylene-based polyunsaturated monomer is in a polymerized state, and may cover any moisture content range or particle size range.

In addition, the term "super absorbent polymer" either means, depending on the context, a cross-linked polymer, or a base polymer in the form of powder in which the cross-linked polymer is made of pulverized super absorbent polymer particles, or is used to cover the cross-linked polymer or the base polymer subjected to additional processes, such as drying, pulverization, classification, surface cross-linking, etc., thereby being in a state suitable for commercialization.

In addition, the term "fine powder" means particles having a particle size of less than 150 μm among super absorbent polymer particles. The particle size of the above-described polymer particles may be measured according to the method of EDANA WSP 220.3 of the European Disposables and Nonwovens Association (EDANA) standards.

In addition, the term "chopping" refers to cutting a hydrogel polymer into small pieces in a millimeter unit to increase drying efficiency, and is used separately from pulverizing the same to a micrometer or normal particle level.

In addition, the term "micronizing, or micronization" refers to pulverizing a hydrogel polymer into pieces having a particle diameter of tens to hundreds of micrometers, and is used separately from "chopping."

In addition, the term "free swelling" refers to a state in which a super absorbent polymer may swell without a suppressing load when absorbing a specific solution.

In the present specification, elemental symbols as those described in the periodic table are used.

Hereinafter, a super absorbent polymer according to a specific aspect of the present disclosure and a preparation method therefor will be described in more detail.

I. Polyacrylic Acid (Salt)-Based Super Absorbent Polymer

The super absorbent polymer of the present disclosure is characterized in that, when a slip strain (%) according to the degree of swelling (%) is shown as a graph, the slip strain (%) after 30% swelling satisfies 12.5% or less, and an absolute value of the rate of change in slip strain at 30% and 70% swelling satisfies 0.04 or less.

The slip strain means a value at the time when a storage modulus rapidly decreases with an increase in strain when the change in the storage modulus is observed by increasing the strain of each sample from 0.01% to 100% using a rheometer under a frequency of 1 Hz and a temperature of 25° C.

The slip strain is a strain at the time when a storage modulus rapidly decreases, and a rapid decrease in the storage modulus may indicate that inter-particle slip occurs. Therefore, the slip strain may mean a strain at the time when the inter-particle slip occurs.

The occurrence of the inter-particle slip even when small deformation is applied, i.e., even at a low strain rate, may mean that the inter-particle slip easily occurs in a super absorbent polymer. Therefore, a small strain at the time when slip occurs, that is, a small slip strain, may mean that the inter-particle slip may easily occur.

If the inter-particle slip easily occurs in a super absorbent polymer, an empty space may be easily formed between a particle and a particle, and a passage through which a fluid may flow between the particle and the particle may be easily formed. That is, if the inter-particle slip easily occurs, permeability may be improved.

Therefore, the smaller the slip strain value, the more easily the inter-particle slip occurs, which may improve the permeability.

Specifically, a method for deriving the slip strain (%) of a polymer resin is as follows.

Step 1) Preparation of Super Absorbent Polymer Dilution Sample

A super absorbent polymer sample (30 to 50 Mesh) was sieved, and the sieved super absorbent polymer sample was weighed to obtain 0.5 g thereof, which was sufficiently swelled in a 0.9% NaCl solution for 1 hour or more.

At this time, the degree of swelling was varied, and based on the centrifuge retention capacity (CRC) of a super absorbent polymer as measured in advance according to EDANA WSP 241.3, the degree of swelling at the time when a solution in accordance with the CRC was added was set to 100%, and samples in which the super absorbent polymer was subjected to each of 30%, 50%, and 70% swelling were prepared.

Step 2) Derivation of Slip Strain of Super Absorbent Polymer 2.5 g of the swollen super absorbent polymer sample was placed in a rheometer (ARES-G2 of TA Co., Ltd.) which used a parallel plate having a diameter of 25 mm, and subjected to amplitude sweep to measure a storage modulus while increasing a strain.

Specifically, the strain was increased from 0.01% to 100% under a frequency of 1 Hz and a temperature of 25° C.

When a measurement sample becomes increasingly deformed as shown in the FIGURE during the amplitude sweep, the viscoelasticity is measured uniformly in a linear region, but when deformed to a predetermined degree or more, inter-particle slip occurs outside the linear region between strain-stress, so that the viscoelasticity is not measured normally, and as a result, the storage modulus rapidly decreases (a nonlinear region).

At this time, a value at the time when the storage modulus rapidly decreases from the linear region to the nonlinear region is defined as a slip strain (%), and the slip strain was measured three times and the average value thereof was adopted as a slip strain value.

Specifically, the slip strain value was obtained by using an Endset function of a measurement program (Trios of TA Co., Ltd.), and the value at the time when the storage modulus rapidly decreases from the linear region to the nonlinear region means a crossing point of a section in which the modulus is constant and a section in which the modulus rapidly decreases (slope of the last 2 points).

The slip strain of the samples in which the super absorbent polymer was subjected to each of 30%, 50%, and 70% swelling was derived by the method described above, and the rate of change in slip strain according to the degree of swelling (%) was calculated by Equation 1 to Equation 3 below.

Rate of change in slip strain at 30% and 70% swelling=[{(slip strain at 70% swelling)−(slip strain at 30% swelling)}/40]  [Equation 1]

Rate of change in slip strain at 30% and 50% swelling=[{(slip strain at 50% swelling)−(slip strain at 30% swelling)}/20]  [Equation 2]

Rate of change in slip strain at 50% and 70% swelling=[{(slip strain at 70% swelling)−(slip strain at 50% swelling)}/20]  [Equation 3]

Up to now, the physical properties of a super absorbent polymer have been mainly observed in a dried state or in a completely swollen state, and the physical properties of a polymer being swollen have not be observed in detail.

However, unlike absorbency or centrifuge retention capacity, in the case of permeability or absorption rate, it can be said that the physical properties of a polymer in a state in which a fluid is absorbed to some extent may be more important than the physical properties thereof in a state before the fluid is absorbed or after the fluid is completely absorbed.

Particularly, as for how easily inter-particle slip occurs, such as a slip strain, determining the physical properties in a somewhat swollen state allows for an accurate understanding of absorption properties of a super absorbent polymer.

Accordingly, the present inventors observed a slip strain according to the degree of swelling by focusing on the physical properties of a polymer while being swollen, and found that if the slip strain is low in an initial swelling state, and remains at a constant level in an intermediate or late swelling state without being significantly different from the slip strain in the initial swelling state, the absorption performance of a super absorbent polymer, such as permeability and absorption rate as well as centrifuge retention capacity, may be excellent in a balanced manner.

Specifically, the present disclosure has been completed by finding that if a slip strain at 30% swelling, which is the initial swelling state, has a value of a specific value or less, and if a slip strain at 50% and 70% swelling is not significantly different from the slip strain at the 30% swelling, excellent absorption properties are exhibited.

At this time, a slip strain at 30% swelling means that only 30% of physiological saline that a super absorbent polymer can hold has been absorbed, a slip strain at 50% swelling means that only 50% of physiological saline that the super absorbent polymer can hold has been absorbed, and a slip strain at 70% swelling means that 70% of physiological saline that the super absorbent polymer can hold is absorbed.

The slip strain at 30% swelling may confirm whether there is slip between super absorbent polymer particles in an initial state in which the super absorbent polymer has absorbed a fluid, the slip strain at 50% swelling may confirm whether there is slip between the super absorbent polymer particles in an intermediate state in which the super absorbent polymer has absorbed the fluid, and the slip strain at 70% swelling may confirm whether there is slip between the super absorbent polymer particles in a late state in which the super absorbent polymer has absorbed the fluid.

A small slip strain means that the inter-particle slip easily occurs, and accordingly, the permeability may be excellent. Therefore, in terms of the permeability, a super absorbent polymer having a small slip strain may be preferable.

However, when the permeability of a super absorbent polymer is excessively high, there may be a problem in that the absorption performance may be degraded. That is, since the permeability and the absorption performance correspond to a trade-off relationship, it is necessary to optimize the permeability and the absorption performance in order to provide an excellent super absorbent polymer.

Therefore, it is preferable in terms of the absorption performance of a super absorbent polymer that a slip strain, which is related to permeability, is in a suitable range during a swelling process.

The super absorbent polymer according to the present disclosure has a slip strain of 12.5% or less at 30% swelling, and an absolute value of the rate of change in slip strain at 30% and 70% swelling of 0.04 or less derived by Equation 1 below.

$$\text{Rate of change in slip strain at 30\% and 70\% swelling} = [\{(\text{slip strain at 70\% swelling}) - (\text{slip strain at 30\% swelling})\}/40] \quad \text{[Equation 1]}$$

The super absorbent polymer of the present disclosure may have an absolute value of the rate of change in slip strain at 30% and 70% swelling of 0.04 or less, 0.03 or less, or 0.02 or less, and the rate of change may have a positive value (+) as well as a negative value (−). In addition, if there is no change in slip strain at all, the absolute value of the rate of change in the slip strain may be 0.

That is, the super absorbent polymer of the present disclosure may have an absolute value of the rate of change in slip strain at 30% and 70% swelling of 0 to 0.04.

The super absorbent polymer of the present disclosure may have an absolute value of the rate of change in slip strain at 30% and 50% swelling of 0.08 or less, 0.05 or less, 0.04 or less, or 0.03 or less, which is derived by Equation 2 below.

$$\text{Rate of change in slip strain at 30\% and 50\% swelling} = [\{(\text{slip strain at 50\% swelling}) - (\text{slip strain at 30\% swelling})\}/20] \quad \text{[Equation 2]}$$

In the same manner, the rate of change may have a positive value (+) as well as a negative value (−), and if there is no change in slip strain at all, the absolute value of the rate of change in the slip strain may be 0.

That is, the super absorbent polymer of the present disclosure may have an absolute value of the rate of change in slip strain at 30% and 50% swelling of 0 to 0.08.

The super absorbent polymer of the present disclosure may have an absolute value of the rate of change in slip strain at 50% and 70% swelling of 0.08 or less, 0.05 or less, 0.04 or less, or 0.03 or less, which is derived by Equation 3 below.

$$\text{Rate of change in slip strain at 50\% and 70\% swelling} = [\{(\text{slip strain at 70\% swelling}) - (\text{slip strain at 50\% swelling})\}/20] \quad \text{[Equation 3]}$$

In the same manner, the rate of change may have a positive value (+) as well as a negative value (−), and if there is no change in slip strain at all, the absolute value of the rate of change in the slip strain may be 0.

That is, the super absorbent polymer of the present disclosure may have an absolute value of the rate of change in slip strain at 50% and 70% swelling of 0 to 0.08.

In an aspect of the present disclosure, the super absorbent polymer may have a slip strain value at 30% swelling of 12.5% or less, 12.3% or less, or 12% or less.

In an aspect of the present disclosure, the super absorbent polymer may have a slip strain value at 30% swelling of 9.5% or greater, 10% or greater, 10.2% or greater, or 10.5% or greater.

In an aspect of the present disclosure, the super absorbent polymer may have slip strain values at 30%, 50%, and 70% swelling, which all satisfy the range of 9.5% or greater, 10% or greater, 10.2% or greater, or 10.5% or greater, and at the same time, 12.5% or less, 12.3% or less, or 12% or less.

Compared to a typical super absorbent polymer, the super absorbent polymer of the present disclosure has a small slip strain during swelling in an initial stage, and thus, has excellent permeability in the initial stage, wherein the change in the slip strain due to swelling is not large even during swelling in intermediate and late stages, so that the permeability may be properly maintained, and even in a state in which a fluid is partially absorbed therein, the super absorbent polymer has an absorption rate not significantly decreased, and thus, may maintain an excellent absorption rate in the initial-intermediate-late absorption stages.

The super absorbent polymer of the present disclosure has a relatively small slip strain in an initial state of fluid absorption, wherein the change in the slip strain of the polymer between the initial state and a late state of the fluid absorption is not large, but satisfies a specific range, which can be seen as meaning that the absorption rate and absorption amount of a fluid are large in the initial state, while the absorption rate and the absorption amount do not significantly change over time.

The super absorbent polymer of the present disclosure may have a centrifuge retention capacity (CRC) in the range of about 33 g/g or greater, about 34 g/g or greater, or about 35 g/g or greater, and about 50 g/g or less, about 45 g/g or less, or about 40 g/g or less, as measured according to the method of EDANA WSP 241.3.

In addition, the super absorbent polymer of the present disclosure may have an absorbency under pressure (AUP) of 2.07 kPa (0.3 psi) in the range of about 25 g/g or greater, about 27 g/g or greater, about 28 g/g or greater, about 29 g/g or greater, or about 30 g/g or greater, and about 45 g/g or less, about 42 g/g or less, or about 40 g/g or less, as measured according to the method of EDANA WSP 242.3.

The super absorbent polymer of the present disclosure may have a vortex time of 40 seconds or less as measured by a vortex measurement method at 24.0° C.

More specifically, the vortex time may be 40 seconds or less, 35 seconds or less, 33 seconds or less, or 30 seconds or less. In addition, the smaller the value, the better the vortex time, and although the lower limit of the vortex time is theoretically 0 second, it may be, for example, 10 seconds or more, 15 seconds or more, or 20 seconds or more.

A method for measuring the centrifuge retention capacity, the absorbency under pressure, and the vortex time of the super absorbent polymer will be described in more detail in the experimental examples to be described later.

In an aspect of the present disclosure, the super absorbent polymer may have a permeability of 3 ml/min or greater as calculated by Equation 4 below. More preferably, the permeability may be 3.5 ml/min or greater, 4 ml/min or greater, 4.5 ml/min or greater, or 5 ml/min or greater, 7 ml/min or less, 6.8 ml/min or less, 6.5 ml/min or less, or 6.3 ml/min or less.

$$\text{Perm}=[20 \text{ mL}/T1 \text{ (second)}]\times 60 \text{ seconds} \quad [\text{Equation 4}]$$

In Equation 4 above, Perm is the permeability of a super absorbent polymer, and T1 indicates time (seconds) taken for 20 mL of physiological saline to pass through a swollen super absorbent polymer under a pressure of 2.07 kPa (0.3 psi) after adding 0.2 g of a super absorbent polymer into a cylinder, pouring physiological saline (0.9 wt % sodium chloride aqueous solution) thereinto such that the super absorbent polymer is completely submerged, thereby allowing the super absorbent polymer to be swollen for 30 minutes.

The permeability means mobility of a solution in the super absorbent polymer, and the larger the value, the better the permeability.

That is, the super absorbent polymer according to the present disclosure may have the T1 of 400 seconds or less. More preferably, the T1 may be 300 seconds or less, 250 seconds or less, or 200 seconds or less. The smaller the value, the better it is. The theoretical lower limit of the T1 is 0 seconds, but as an example, may be 3 seconds or more, 5 seconds or more, or 10 seconds or more.

The "extractable contents" refers to a compound in the form of a polymer not cross-linked in the process of preparing a super absorbent polymer, which may be generated due to incomplete cross-linking when the super absorbent polymer is polymerized, resulting in no cross-linking, or decomposition of a cross-linking agent during a chopping or drying process, or breakage of a main polymer chain.

The extractable contents may be eluted when the super absorbent polymer is exposed to a liquid, and the extractable contents mostly remain on the surface of the super absorbent polymer. Accordingly, the surface of the super absorbent polymer may become sticky, which may reduce permeability. This may cause a problem of unpleasant feeling when the super absorbent polymer is used in an actual product.

That is, a problem related to cross-linking of the super absorbent polymer may be confirmed by measuring the content of extractable contents eluted from a super absorbent polymer solution. That is, since the content of extractable contents is closely related to an inter-chain cross-linking structure in the super absorbent polymer, a high content of extractable contents means that the inter-chain cross-linking structure in the super absorbent polymer is incomplete.

Since the super absorbent polymer is widely used in hygiene products such as diapers, 0.9% brine, which has an ion concentration and an electrical conductivity similar to those of urine discharged from the body, is used to evaluate the amount of elution of extractable contents.

However, the super absorbent polymer is also widely used as a material for soil repair agents for horticulture, a civil engineering work, a construction index material, a seedling sheet, a freshness maintaining agent in a food distribution field, and a fomentation. In this case, it is necessary for extractable contents to have an excellent absorption behavior in water having an electrical conductivity of 100 µS/cm to 130 µS/cm.

That is, even if the same super absorbent polymer is used, the absorption behavior in water having an electrical conductivity of 100 µS/cm to 130 µS/cm and the absorption behavior in 0.9% bring having an electrical conductivity of about 16,100 µS/cm are bound to be different.

The content of extractable contents is closely related to the inter-chain cross-linking structure in the super absorbent polymer, and in the case of using 0.9% salt water, the volume at which the super absorbent polymer expands is small, so that the elution amount of extractable contents is small, but in the case of using water having an electrical conductivity of 100 µS/cm to 130 µS/cm, the super absorbent polymer expands more, thereby increasing the gap between chains in the super absorbent polymer, so that the elution amount of extractable contents increases, through which the correlation between the inter-chain cross-linking structure and the absorption behavior in the super absorbent polymer may be more accurately identified.

For example, even if two different super absorbent polymers have the same content of extractable contents in 0.9% salt water, the content of extractable contents thereof in water having an electrical conductivity of 100 µS/cm to 130 µS/cm may greatly vary depending on the cross-linking properties, and this is because the degree of cross-linking inside the super absorbent polymer affects the content of extractable contents.

For the above-described reason, it is not possible to directly compare results of experiments on the elution amount of extractable contents after free swelling using 0.9% salt water having an electrical conductivity of about 16,100 µS/cm and the absorption properties with results of experiments obtained after free swelling with water having an electrical conductivity of 100 µS/cm to 130 µS/cm as in the present disclosure.

That is, even if the same super absorbent polymer is used, the absorption behavior in water having an electrical conductivity of 100 µS/cm to 130 µS/cm and the absorption behavior in 0.9% salt water having an electrical conductivity of about 16,100 S/cm are bound to be different, and accordingly, it is not possible to predict the content of extractable contents after free swelling with 0.9% salt water having an electrical conductivity of about 16,100 µS/cm by using the content of extractable contents after performing free swelling for 1 hour with water having an electrical conductivity of 100 µS/cm to 130 µS/cm, and vice versa.

Therefore, in order to implement a super absorbent polymer having an excellent physical property balance by simultaneously improving absorption properties and permeability, identifying the elution amount of extractable contents in water having an electrical conductivity of 100 µS/cm to 130 µS/cm may be independently meaningful separate from using 0.9% salt water having an electrical conductivity of about 16,100 µS/cm.

Accordingly, the present inventors have tried to develop a super absorbent polymer excellent in absorption rate and absorption capacity with respect to water having an ion concentration and an electrical conductivity lower than those of 0.9% brine, the water having an electrical conductivity of 100 µS/cm to 130 µS/cm, that is, about 1/100 of the electrical conductivity of 0.9% brine, and have implemented the super absorbent polymer by adjusting the change in slip strain according to the degree of swelling of the super absorbent polymer to be constant.

In the case of water within an electrical conductivity range of 100 µS/cm to 130 µS/cm, there is no significant difference in absorption properties, so that water which belongs to the above-described electrical conductivity range may be used, and for example, water having an electrical conductivity of 110 µS/cm may be used.

In an aspect of the present disclosure, the content of extractable contents measured after free swelling the super absorbent polymer for 1 hours with water having an electrical conductivity of 100 µS/cm to 130 µS/cm may be 15 wt % or less, 14 wt % or less, 13 wt % or less, or 12 wt % or less based on the total weight of the super absorbent polymer. In addition, the smaller the value, the better the extractable contents, and although the lower limit thereof is theoretically 0 wt %, it may be, for example, 1 wt % or greater, 2 wt % or greater, or 3 wt % or greater.

If the elution amount of extractable contents in water having an electrical conductivity of 100 µS/cm to 130 µS/cm is at a predetermined level or below, it is possible to implement a super absorbent polymer having an excellent physical property balance by simultaneously improving absorption properties and permeability, which are the opposite properties, but if the content of extractable contents measured after free swelling the super absorbent polymer in water having an electrical conductivity of 100 µS/cm to 130 µS/cm is greater than 15 wt % based on the total weight of the super absorbent polymer, it cannot be said that cross-linking properties between polymer chains are excellent, and when coming into contact with the skin in a swollen state, the super absorbent polymer may cause discomfort or damage to the skin.

In an aspect of the present disclosure, the content of extractable contents measured after free swelling the super absorbent polymer for 16 hours with water having an electrical conductivity of 100 µS/cm to 130 µS/cm may be 25 wt % or less, 23 wt % or less, 21 wt % or less, or 19 wt % or less based on the total weight of the super absorbent polymer. In the same manner, the smaller the value, the better the extractable contents, and although the lower limit thereof is theoretically 0 wt %, it may be, for example, 1 wt % or greater, 2 wt % or greater, or 3 wt % or greater.

The amount of extractable contents eluted after free swelling the super absorbent polymer for 16 hours refers to the total content of extractable contents included in the super absorbent polymer.

When the content of extractable contents measured after free swelling the super absorbent polymer for 16 hours in water having an electrical conductivity of 100 µS/cm to 130 µS/cm is greater than 25 wt % based on the total weight of the super absorbent polymer, cross-linking is incomplete when polymerizing the super absorbent polymer, so that the centrifuge retention capacity and the absorbency under pressure, which are overall physical properties of the super absorbent polymer, may be significantly reduced.

By allowing the super absorbent polymer of the present disclosure to have excellent internal cross-linking properties, it is possible to adjust the elution amount of extractable contents in water having an electrical conductivity of 100 µS/cm to 130 µS/cm to a predetermined level or below, and accordingly, the centrifuge retention capacity, the absorbency under pressure, and the absorption rate, which are overall physical properties of the super absorbent polymer, may also be improved.

Specifically, when 1 g of the super absorbent polymer of the present disclosure is free-swollen for 30 seconds with water having an electrical conductivity of 100 µS/cm to 130 µS/cm, the free swell capacity of water containable by the super absorbent polymer may be 70 g or more, 75 g more, or 80 g or more.

It can be seen that the larger the value of a free swell capacity of water containable by the super absorbent polymer, the larger amount of water having an electrical conductivity of 100 µS/cm to 130 µS/cm is absorbed, but as an example, the free swell capacity of water containable by the super absorbent polymer in 30 seconds may be 200 g or less, 180 g or less, or 150 g or less.

In addition, when 1 g of the super absorbent polymer of the present disclosure is free-swollen for 120 seconds with water having an electrical conductivity of 100 µS/cm to 130 µS/cm, the free swell capacity of water containable by the super absorbent polymer may be 200 g or more, 220 g more, or 240 g or more.

In the same manner, it can be seen that the larger the value of a free swell capacity of water containable by the super absorbent polymer, the larger amount of water having an electrical conductivity of 100 µS/cm to 130 µS/cm is absorbed, but as an example, the free swell capacity of water containable by the super absorbent polymer in 120 seconds may be 400 g or less, 350 g or less, or 320 g or less.

If used in a hygiene product such as a diaper or a sanitary napkin, the super absorbent polymer may have an ability to be dried fast when in contact with moisture, and needs to have an excellent initial absorbency, and it was confirmed that the super absorbent polymer according to the present disclosure had an excellent initial absorbency by measuring the maximum absorption capacity at 30 seconds and 120 seconds to evaluate the initial absorbency of the super absorbent polymer.

Specifically, the free swell capacity of water containable by the super absorbent polymer when free-swollen for 30 seconds refers to the absorbency at the very initial stage in which the super absorbent polymer immediately absorbs water when in contact with water having an electrical conductivity of 100 µS/cm to 130 µS/cm, and the free swell capacity of water containable by the super absorbent polymer when free-swollen for 120 seconds refers to the absorbency at the initial stage in which the super absorbent polymer comes into contact with water having an electrical conductivity of 100 µS/cm to 130 µS/cm. At this time, the distinction between the very initial stage and the initial stage is relative, and the stages are arbitrarily divided intervals to compare the initial absorbency of the super absorbent polymer.

The super absorbent polymer has an absorbency of 70 g/g or greater when free-swollen for 30 seconds with water having an electrical conductivity of 100 µS/cm to 130 µS/cm, and thus, can be confirmed to absorb water immediately, and has an absorbency of 200 g/g or greater when free-swollen for 120 seconds, and thus, can be confirmed to have an excellent initial absorbency.

A method for measuring the absorbency in water having an electrical conductivity value of 100 µS/cm to 130 µS/cm will be described in more detail in the section of experimental examples to be described later.

When 1 g of the super absorbent polymer is free swollen with water having an electrical conductivity of 100 µS/cm to 130 µS/cm, the super absorbent polymer of the present disclosure may have an average absorption rate from 0 second to 30 seconds of 2.5 g/g/sec or greater, 2.6 g/g/sec or greater, or 2.7 g/g/sec or greater.

The larger the value of the average absorption rate, the better it is, so that there is no upper limit to the average rate in theory, but as an example, when 1 g of the super absorbent polymer is free swollen with water having an electrical conductivity of 100 µS/cm to 130 µS/cm, the average absorption rate from 0 second to 30 seconds may be 10 g/g/sec or less, 9 g/g/sec or less, or 8 g/g/sec or less.

In addition, when 1 g of the super absorbent polymer of the present disclosure is free swollen with water having an electrical conductivity of 100 µS/cm to 130 µS/cm, the average absorption rate from 30 second to 120 seconds may be 1.4 g/g/sec or greater, 1.5 g/g/sec or greater, or 1.6 g/g/sec or greater.

In the same manner, the larger the value of the average absorption rate, the better it is, so that there is no upper limit to the average rate in theory, but as an example, when 1 g of the super absorbent polymer is free swollen with water having an electrical conductivity of 100 µS/cm to 130 µS/cm, the average absorption rate from 30 second to 120 seconds may be 8 g/g/sec or less, 7 g/g/sec or less, or 6 g/g/sec or less.

In the same manner, in order to evaluate the initial absorbency of the super absorbent polymer, the absorption rate in each section was measured by dividing the absorption section with respect to water having an electrical conductivity of 100 µS/cm to 130 µS/cm into 0 second to 30 seconds and 30 seconds to 120 seconds.

The super absorbent polymer has an average absorption rate of 2.7 g/g/sec or greater from 0 second to 30 seconds when free-swollen for 30 seconds with water having an electrical conductivity of 100 µS/cm to 130 µS/cm, and thus, can be confirmed to absorb water immediately upon contact with water, and has an average absorption rate of 1.5 g/g/sec or greater from 30 seconds to 120 seconds, and thus, can be confirmed to have a very excellent initial absorption rate.

A method for measuring the average vortex time for each section in water having an electrical conductivity value of 100 µS/cm to 130 µS/cm will be described in more detail in the section of experimental examples to be described later.

In an aspect of the present disclosure, the super absorbent polymer may have a gel strength of 0.7 N or greater, 0.8 N or greater, or 0.9 N or greater after the super absorbent polymer is swollen with 50 ml of brine in which 0.005% ASC is dissolved. In addition, the gel strength may be 1.5 N or less, 1.4 N or less, 1.3 N or less, 1.2 N or less, 1.1 N or less, or 1.0 N or less. Due to the high gel strength as described above, it is possible to reduce the amount of generation of fine powder caused by crushing and to reduce surface cross-linking damage, thereby exhibiting an effect of preventing the degradation in physical properties. In addition, even if the super absorbent polymer absorbs water and increases in volume, the super absorbent polymer may maintain the shape well, and as a result, may exhibit improved absorbency and permeability. A method for measuring the gel strength of the super absorbent polymer will be described in more detail in the section of experimental examples to be described later.

The super absorbent polymer according to the present disclosure may be implemented by appropriately adjusting manufacturing process conditions such as components/content of the super absorbent polymer, polymerization process conditions, or pulverization process conditions of the super absorbent polymer. That is, it is possible to prepare a super absorbent polymer in which the change in slip strain according to the degree of swelling is constant by adjusting the above-described process conditions.

For example, by adjusting the type and content of the monomer composition, and the type and amount of the internal cross-linking agent in the polymerization process, the type, introduction amount, and introduction timing of the surfactant, and the type, introduction amount, and introduction timing of the neutralizing agent in the micronization and neutralization steps, the type, rotation speed, hole size, and number of micronization times of a micronization device, it is possible to control such that the change in slip strain according to the degree of swelling may have a constant value.

Hereinafter, each component constituting the super absorbent polymer will be described in more detail.

A polyacrylic acid (salt)-based super absorbent polymer of an aspect of the disclosure includes a base polymer including a water-soluble ethylene-based unsaturated monomer having an acid group and a cross-linked polymer of an internal cross-linking agent. The cross-linked polymer may preferably be formed by polymerizing a monomer composition which includes components such as a monomer, an internal cross-linking agent, a polymerization initiator, and the like.

Here, the water-soluble ethylene-based unsaturated monomer may be any monomer commonly used in the preparation of a super absorbent polymer. As a non-limiting example, the water-soluble ethylene-based unsaturated monomer may be a compound represented by Formula 1 below.

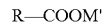                                                            [Formula 1]

In Formula 1 above, R is an alkyl group having 2 to 5 carbon atoms including an unsaturated bond, and M' is a hydrogen atom, a monovalent or divalent metal, an ammonium group, or an organic amine salt.

Preferably, the monomer may be a (meth)acrylic acid, and one or more selected from the group consisting of a monovalent (alkali) metal salt, a divalent metal salt, an ammonium salt, and organic amine salt of these acids.

If the (meth)acrylic acid and/or a salt thereof is used as the water-soluble ethylene-based unsaturated monomer as described above, it is advantageous in terms of obtaining a super absorbent polymer with improved absorbency. In addition, as the monomer, maleic anhydride, fumaric acid, crotonic acid, itaconic acid, 2-acryloylethane sulfonic acid, 2-methacryloylethanesulfonic acid, 2-(meth)acryloylpropanesulfonic acid or 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth)acrylamide, or the like may be used.

The water-soluble ethylene-based unsaturated monomer has an acid group. In the preparation of the super absorbent polymer, at least a portion of the acid group forms a polymer by cross-linking a monomer neutralized by a neutralizing agent, but in the present disclosure, the acid group may preferably be neutralized not during polymerization, but after the formation of a polymer. More specific details on this will be provided in the section on a method for preparing a super absorbent polymer.

The concentration of the water-soluble ethylene-based unsaturated monomer in the monomer composition may be appropriately adjusted in consideration of polymerization time, reaction conditions, etc., and may be about 20 wt % to about 60 wt %, or about 20 wt % to about 40 wt %.

As used herein, the term "internal cross-linking agent" is a term used to distinguish the same from a surface cross-linking agent for performing cross-linking on the surface of super absorbent polymer particles to be described later, and an internal cross-linking agent serves to form a polymer including a cross-linking structure by introducing a cross-linking bond between unsaturated bonds of the above-described water-soluble ethylene-based unsaturated monomers.

The cross-linking in the above step is performed without distinction between the surface and the inside, but if a surface cross-linking process of the super absorbent polymer particles to be described later is performed, the surfaces of finally prepared super absorbent polymer particles may include a structure newly cross-linked by the surface cross-linking agent, and the inside of the super absorbent polymer particles may maintain a structure cross-linked by the internal cross-linking agent.

According to an aspect of the present disclosure, the internal cross-linking agent may include one or more of a polyfunctional acrylate-based compound, a polyfunctional allyl-based compound, or a polyfunctional vinyl-based compound.

Non-limiting examples of the polyfunctional acrylate-based compound may include ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, tripropylene glycol di(meth)acrylate, polypropylene glycol di(meth)acrylate, butanediol di(meth)acrylate, butylene glycol di(meth)acrylate, hexanediol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, trimethylolpropane di(meth)acrylate, trimethylolpropane tri(meth)acrylate, glycerin di(meth)acrylate, glycerin tri(meth)acrylate, and the like, and any one thereof may be used alone, or two or more thereof may be mixed and used.

Non-limiting examples of the polyfunctional allyl-based compound may include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropyleneglycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, glycerin triallyl ether, and the like, and any one thereof may be used alone, or two or more thereof may be mixed and used.

Non-limiting examples of the polyfunctional vinyl-based compound may include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, glycerin trivinyl ether, and the like, and any one thereof may be used alone or two or more thereof may be mixed and used. Preferably, pentaerythritol triallyl ether may be used.

In the above-described polyfunctional allyl-based compound, or the polyfunctional vinyl-based compound, two or more unsaturated groups included in a molecule may be respectively bonded to unsaturated bonds of the water-soluble ethylene-based unsaturated monomers or unsaturated bonds of another internal cross-linking agent, thereby forming a cross-linking structure during a polymerization process, and unlike an acrylate-based compound including an ester bond (—(C=O)O—) in a molecule, may maintain cross-linking bonds more stably even during a neutralization process to be described later after the polymerization reaction.

Accordingly, the gel strength of a prepared super absorbent polymer may increase, the process stability may increase during a discharge process after polymerization, and the amount of extractable contents may be reduced to a minimum.

Cross-linking polymerization of the water-soluble ethylene-based unsaturated monomer in the presence of the above-described internal cross-linking agent may be performed in the presence of a polymerization initiator, and if necessary, a thickener, a plasticizer, a preservation stabilizer, an antioxidant, and the like.

In the monomer composition, the above-described internal cross-linking agent may be used in an amount of 0.01 parts by weight to 5 parts by weight based on 100 parts by weight of the water-soluble ethylene-based unsaturated monomer. For example, the internal cross-linking agent may be used in an amount of 0.01 parts by weight or greater, 0.05 parts by weight or greater, or 0.1 parts by weight or greater, and 5 parts by weight or less, 3 parts by weight or less, 2 parts by weight or less, 1 part by weight or less, or 0.7 parts by weight or less. If the content of the internal cross-linking agent is too low, cross-linking is not sufficiently achieved, so that it may be difficult to implement strength of an appropriate level or above, and if the content of the internal cross-linking agent is too high, the internal cross-linking density increases, so that it may be difficult to implement a desired centrifuge retention capacity. Particularly, when in the above-described range, it is suitable to implement such that the super absorbent polymer according to the present disclosure has a constant value of the change in slip strain according to the degree of swelling.

If the internal cross-linking agent is used in a small content to allow the base polymer to have a high centrifuge retention capacity (CRC), the gel strength of a prepared polymer may be lowered, and due to the low gel strength, it may be difficult to operate a chopper and the like when chopping a hydrogel polymer. In this case, two or more types of internal cross-linking agents may be mixed and used for the operation of a high-speed rotating chopper and the like to increase the gel strength, thereby increasing the operating stability of the chopping and the like.

The shape of particles of the formed hydrogel polymer may change depending on the degree of internal cross-linking, and a polymer formed using such an internal cross-linking agent may have a three-dimensional network structure in the form in which main chains formed by the polymerization of the water-soluble ethylene-based unsaturated monomers are cross-linked by the internal cross-linking agent.

As described above, if a polymer has a three-dimensional network structure, the centrifuge retention capacity and the absorbency under pressure, which are overall physical properties of a super absorbent polymer, may be significantly improved compared to having a two-dimensional linear structure in which additional cross-linking is not performed by an internal cross-linking agent.

The polymer is prepared by polymerizing a monomer and an internal cross-linking agent in the presence of a polymerization initiator, and the type of the polymerization initiator is not particularly limited, but preferably, the polymerization may be performed using a thermal polymerization method in a batch reactor, and accordingly, a thermal polymerization initiator may be used as the polymerization initiator.

As the thermal polymerization initiator, one or more selected from the group consisting of a persulfate-based initiator, an azo-based initiator, and an initiator composed of hydrogen peroxide and ascorbic acid may be used. Specifically, examples of the persulfate-based initiator include sodium persulfate ($Na_2S_2O_8$), potassium persulfate ($K_2S_2O_8$), ammonium persulfate (($NH_4)_2S_2O_8$), and the like, and examples of the azo-based initiator include 2,2-azobis(2-amidinopropane) dihydrochloride, 2,2-azobis-(N, N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid), and the like. More various thermal polymerization initiators are well specified on p203 of 'Principle of Polymerization (Wiley, 1981)' written by Odian, and are not limited to the above-described examples.

The above-described polymerization initiator may be used in an amount of 2 parts by weight or less based on 100 parts by weight of the water-soluble ethylene-based unsaturated monomer. That is, if the concentration of the polymerization initiator is too low, it is not preferable in that the polymerization rate may decrease, and remaining monomers may be extracted in a large amount in a final product. On the contrary, if the concentration of the polymerization initiator is higher than the above-described range, it is not preferable in that polymer chains forming a network is shortened, thereby degrading the physical properties of a polymer, such as increasing the content of extractable contents and lowering the absorbency under pressure.

In an aspect of the present disclosure, the above-described polymerization initiator and a reducing agent forming a redox couple may be introduced together to the monomer composition to initiate polymerization.

Specifically, the initiator and the reducing agent react with each other when introduced to a polymer solution and form radicals.

The formed radicals react with the monomer, and since an oxidation-reduction reaction between the initiator and the reducing agent is highly reactive, polymerization is initiated even when only a trace amount of the initiator and the reducing agent are introduced, so that it is not necessary to increase the process temperature, thereby allowing low-temperature polymerization, and it is possible to minimize changes in physical properties of the polymer solution.

The polymerization reaction using the oxidation-reduction reaction may smoothly occur even at a temperature near or below room temperature (25° C.). For example, the polymerization reaction may be performed at a temperature of 5° C. to 25° C. or 5° C. to 20° C.

In an aspect of the present disclosure, if a persulfate-based initiator is used as the initiator, the reducing agent may be one or more selected from the group consisting of sodium metabisulfite ($Na_2S_2O_5$), tetramethyl ethylenediamine (TMEDA), a mixture of iron(II) sulfate and EDTA ($FeSO_4$/EDTA), sodium formaldehyde sulfoxylate, and disodium 2-hydroxy-2-sulfinoacteate.

As an example, potassium persulfate may be used as the initiator, and disodium 2-hydroxy-2-sulfinoacteate may be used as the reducing agent, ammonium persulfate may be used as the initiator, and tetramethylammoniumdiamine may be used as the reducing agent, sodium persulfate may be used as the initiator, and sodium formaldehyde sulfoxylate may be used as the reducing agent.

In another aspect of the present disclosure, when a hydrogen peroxide-based initiator is used as the initiator, the reducing agent may be one or more selected from the group consisting of ascorbic acid, sucrose, sodium sulfite ($Na_2SO_3$), sodium metabisulfite ($Na_2S_2O_5$), tetramethyl ethylenediamine (TMEDA), a mixture of iron(II) sulfate and EDTA ($FeSO_4$/EDTA), sodium formaldehyde sulfoxylate, disodium 2-hydroxy-2-sulfinoacteate, and disodium 2-hydroxy-2-sulfoacteate.

The above-described monomer composition may further include an additive such as a thickener, a plasticizer, a preservation stabilizer, an antioxidant, or the like, if necessary.

In addition, the monomer composition including monomers may be, for example, in the state of a solution dissolved in a solvent such as water, and the content of solids in the monomer composition of the above-described solution state, i.e., the concentration of the monomers, the internal cross-linking agent, and the polymerization initiator, may be adjusted appropriately in consideration of the polymerization time, reaction conditions, etc. For example, the content of solids in the monomer composition may be 10 wt % to 80 wt %, 15 wt % to 60 wt %, or 30 wt % to 50 wt %.

A solvent that may be used at this time may be used without limitation in composition as long as the solvent can dissolve the above-mentioned components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butylolactone, carbitol, methyl cellosolve acetate, N,N-dimethylacetamide, and the like may be used in combination.

The polymer obtained by the above-described method may form a polymer having a high molecular weight and a uniform molecular weight distribution by performing polymerization by using an ethylene-based unsaturated monomer in an unneutralized state. As a result, the content of water-soluble components is reduced, which may improve the performance of the super absorbent polymer.

In addition, the polymer may have a moisture content of 30 wt % to 80 wt %. For example, the moisture content of the polymer may be 30 wt % or greater, 45 wt % or greater, or 50 wt % or greater, and 80 wt % or less, 70 wt % or less, or 60 wt % or less.

If the moisture content of the polymer is too low, it is difficult to obtain an appropriate surface area in a pulverization step, so that effective pulverization may not be achieved, and if the moisture content of the polymer is too high, a pressure applied in the pulverization step may increase, so that it may be difficult to perform pulverization to a desired particle size.

Throughout the present specification, the term "moisture content" refers to a value obtained by subtracting the weight of a polymer in a dry state from the weight of the polymer by the content of moisture occupying with respect to the total weight of the polymer. Specifically, the moisture content is defined as a value calculated by measuring the weight loss due to moisture evaporation from a polymer during a drying process performed by raising the temperature of the polymer in a crumb state through infrared heating. At this time, conditions of the drying are to increase the temperature from room temperature to about 180° C. and then maintain the temperature at 180° C., and the total drying time is set to 40 minutes, including 5 minutes for raising the temperature, and then the moisture content is measured.

The super absorbent polymer according to an aspect of the present disclosure includes the above-described base polymer powder containing the water-soluble ethylene-based unsaturated monomer having an acid group and the cross-linked polymer of an internal cross-linking agent, and a surface cross-linked layer formed on the base polymer powder by further cross-linking the cross-linked polymer by means of a surface cross-linking agent.

The surface cross-linked layer is formed on at least a portion of the surface of the base polymer powder, and may be formed by further cross-linking the cross-linked polymer included in the base polymer powder by means of the surface cross-linking agent.

As the surface cross-linking agent, any surface cross-linking agent used in the preparation of a super absorbent polymer may be used without particular limitation. For example, the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1, 3-propanediol, 2,5-hexanediol, 2-methyl-1,3-pentanediol, 2-methyl-2,4-pentanediol, tripropylene glycol, and glycerol, at least one carbonate-based compound selected from the group consisting of ethylene carbonate, propylene carbonate, and glycerol carbonate, an epoxy compound such as ethylene glycol diglycidyl ether, an oxazoline compound such as oxazolidinone, a polyamine compound, a mono-, di- or polyoxazolidinone compound, a cyclic urea compound, or the like.

Specifically, one or more, two or more, or three or more of the above-described surface cross-linking agents may be used as the surface cross-linking agent, and for example, ethylene carbonate-propylene carbonate (ECPC), propylene glycol, and/or glycerol carbonate may be used.

The above-described surface cross-linking agent may be used in an amount of about 0.001 parts by weight to about 5 parts by weight based on 100 parts by weight of the super absorbent polymer particles. For example, the surface cross-linking agent may be used in an amount of 0.005 parts by weight or greater, 0.01 parts by weight or greater, or 0.05 parts by weight or greater, and 5 parts by weight or less, 4 parts by weight or less, or 3 parts by weight or less based on 100 parts by weight of the super absorbent polymer particles. The content range of the surface cross-linking agent may be adjusted to be within the above-described range to prepare a super absorbent polymer exhibiting excellent overall absorption physical properties. Particularly, when in the above-described range, it is suitable to implement such that the super absorbent polymer of the present disclosure has a constant value of the change in slip strain according to the degree of swelling.

In addition, the surface cross-linked layer may be formed by adding an inorganic material to the surface cross-linking agent. That is, in the presence of the surface cross-linking agent and the inorganic material, the surface cross-linked layer may be formed by further cross-linking the surface of the base polymer powder.

As the above-described inorganic material, one or more inorganic materials selected from the group consisting of silica, clay, alumina, a silica-alumina composite, titania, a zinc oxide, and an aluminum sulfate may be used. The above-described inorganic material may be used in a powder form or a liquid form, and particularly, may be used as alumina powder, silica-alumina powder, titania powder, or a nano-silica solution. In addition, the inorganic material may be used in an amount of about 0.001 parts by weight to about 1 part by weight based on 100 parts by weight of super absorbent polymer particles.

As described above, the super absorbent polymer including the base polymer powder and the surface cross-linked layer formed on the base polymer powder may absorb body fluids or water at a high speed, and also, may absorb a relatively large amount thereof in the beginning, and thus, may prevent a problem such as accumulation of the body fluids or the water without being absorbed, or the leakage thereof to the outside.

II. Method for Preparing Super Absorbent Polymer

A typical super absorbent polymer is prepared in the presence of an internal cross-linking agent and a polymerization initiator by cross-linking polymerizing a water-soluble ethylene-based unsaturated monomer to form a hydroxyl gel polymer, drying the hydroxyl gel polymer thus formed, and then pulverizing the same to a desired particle size, and typically, at this time, in order to facilitate the drying of the hydroxyl gel polymer, and to increase the efficiency of the pulverization process, a chopping process is performed in which the hydroxyl gel polymer is cut into particles having a size of several millimeters prior to the drying process. However, in the above-described chopping process, due to the adhesiveness of the hydrogel polymer, the hydrogel polymer is not pulverized to a micro-size particle level and becomes an aggregated gel form. When the hydrogel polymer in the form of the aggregated gel is dried, a plate-shaped dried body is formed, and in order to pulverize the same to a micro-size particle level, a pulverization process may be performed to reduce the adhesiveness of the multi-stage polymer, wherein there has been a problem in which a large amount of fine powder is generated in the process.

In order to solve the above-described problem, a method in which the separated fine powder is reused by being mixed with an appropriate amount of water to be re-assembled, and then being introduced in a chopping step or a pre-drying step. However, in the process of reusing the fine powder, there has been a problem of causing an increase in equipment load and/or energy usage. In addition, remaining fine powder that has not been classified even after the reuse causes degradation in the physical properties of a super absorbent polymer.

As a result of repeated research for solving the above-described problem, it has been confirmed that, instead of performing polymerization in a state in which an acid group of a water-soluble ethylene-based unsaturated monomer is neutralized as in a typical method for preparing a super absorbent polymer, if polymerization is first performed to form a polymer in a state in which an acid group is not neutralized, and the hydrogel polymer is micronized in the presence of a surfactant, followed by neutralizing an acid group of the polymer, the acid group of the polymer is neutralized to form a hydrogel polymer, and then the hydrogel polymer is micronized in the presence of a surfactant, or the acid group present in the polymer is neutralized at the same time as micronization, the surfactant is present in a large amount on the surface of the polymer, and is allowed to sufficiently serve to lower high adhesiveness of the polymer, thereby preventing the polymer from being excessively aggregated, and to control the aggregation status to a desired level.

The super absorbent polymer according to the present disclosure may be implemented by adjusting components and contents of the polymer, polymerization conditions, or pulverization process conditions. For example, by adjusting the type and content of the monomer composition, and the type and amount of the internal cross-linking agent in the polymerization process, the type, introduction amount, and introduction timing of the surfactant, and the type, introduction amount, and introduction timing of the neutralizing agent in the micronization and neutralization steps, the type, rotation speed, hole size, and the number of times of micronization of a micronization device, the composition and content of the surface cross-linking solution, and the like, it is possible to control such that the super absorbent polymer has a constant value of the change in slip strain according to the degree of swelling.

Particularly, in the process of preparing the super absorbent polymer, when the polymerization process, the micronization process, and the surface cross-linking process are performed, it is possible to control such that the super absorbent polymer has a constant value of the change in slip strain according to the degree of swelling by adjusting the neutralization timing and polymerization conditions, whether the ultra-fine pulverization process is applied, adjusting the component and content of the surface cross-linking solution, adjusting the hole size, or adjusting the number of times of the micronization.

Hereinafter, a method for preparing a super absorbent polymer according to one aspect will be described in more detail for each step.

Step 1: Polymerization Step

First, polymerization is performed on a monomer composition including a water-soluble ethylene-based unsaturated monomer having an acid group and an internal cross-linking agent to prepare base polymer powder in which the water-soluble ethylene-based unsaturated monomer having an acid group and the internal cross-linking agent are cross-linking polymerized.

The above-described step may include mixing the water-soluble ethylene-based unsaturated monomer having an acid group, the internal cross-linking agent, and a polymerization initiator to prepare a monomer composition and polymerizing the monomer composition to form a polymer.

Here, the same contents described with reference to the super absorbent polymer of Item I above may be equally applied to each component.

The water-soluble ethylene-based unsaturated monomer has an acid group. As described above, in the preparation of a typical super absorbent polymer, the monomer in which at least a portion of an acid group has been neutralized by a neutralizing agent is cross-linked to form a polymer. Specifically, in the step of mixing the water-soluble ethylene-based unsaturated monomer having an acid group, the internal cross-linking agent, the polymerization initiator, and the neutralizing agent, at least a portion of the acid group of the water-soluble ethylene-based unsaturated monomer has been neutralized.

However, according to an aspect of the present disclosure, a polymer is formed by performing polymerization first in a state in which the acid group of the water-soluble ethylene-based unsaturated monomer is not neutralized.

The water-soluble ethylene-based unsaturated monomer (e.g., acrylic acid) in a state in which the acid group is not neutralized is in a liquid state at room temperature and has high miscibility with a solvent (water), thereby being present in a mixed solution state in a monomer composition. However, the water-soluble ethylene-based unsaturated monomer in which the acid group is neutralized is in a solid state at room temperature, has different solubility depending on the temperature of a solvent (water), and has lower solubility as a lower temperature.

The water-soluble ethylene-based unsaturated monomer in which the acid group is not neutralized has higher solubility or miscibility with respect to a solvent (water) than a monomer in which an acid group is neutralized, and thus, is not precipitated even at a low temperature, and accordingly, is advantageous in long-term polymerization at a low temperature. Accordingly, it is possible to stably form a polymer having a higher molecular weight and a uniform molecular weight distribution by performing long-term polymerization using the water-soluble ethylene-based unsaturated monomer in a state in which the acid group is not neutralized.

In addition, it is possible to form a polymer with a longer chain, so that an effect of reducing the content of extractable contents present in a uncross-linked state due to incomplete polymerization or cross-linking may be achieved, and accordingly, it is suitable to implement such that the super absorbent polymer has a constant value of the change in slip strain according to the degree of swelling.

In addition, as described above, if polymerization is first performed to form a polymer in a state in which an acid group of a monomer is not neutralized, and the polymer is neutralized, and then micronized in the presence of a surfactant, micronized in the presence of a surfactant and then polymerized, or micronized simultaneously with neutralizing an acid group present in the polymer, the surfactant is present in a large amount on the surface of the polymer to sufficiently serve to lower the adhesiveness of the polymer.

According to an aspect of the present disclosure, the step of performing polymerization on the monomer composition to form a polymer may be performed for 1 hour or more in a batch-type reactor.

In a typical method for preparing a super absorbent polymer, the polymerization method is largely divided into thermal polymerization and photopolymerization depending on a polymerization energy source, and typically, the thermal polymerization may be performed in a reactor with a stirring shaft such as a kneader, and the photopolymerization may be performed in a flat-bottomed vessel.

If the polymerization is performed as continuous polymerization, for example, if polymerization is performed in a reactor having a conveyor belt, a new monomer composition is supplied to the reactor as a polymerization product moves, thereby achieving polymerization in a continuous manner, so that polymers having different polymerization rates are mixed, and accordingly, it is difficult to achieve even polymerization in the entire monomer composition, which may cause degradation in the overall physical properties.

However, according to an aspect of the present disclosure, polymerization is performed in a stationary manner in a batch reactor, so that there is less risk of mixing polymers with different polymerization rates, and accordingly, a polymer having uniform quality may be obtained.

In addition, the above-described polymerization step is performed in a batch reactor having a predetermined volume, and performs a polymerization reaction for a long period of time, for example, 1 hour or more, 3 hours or more, or 6 hours or more, compared to a case in which polymerization is performed in a continuous manner in a reactor having a conveyor belt. Despite the long polymerization reaction time as described above, since polymerization is performed on a water-soluble ethylene-based unsaturated monomer in an unneutralized state, the monomer is not easily precipitated even when the polymerization is performed for a long period of time, and therefore, it is advantageous for long-term polymerization.

Meanwhile, the polymerization in a batch reactor of the present disclosure is performed by a thermal polymerization method, so that a thermal polymerization initiator is used as the polymerization initiator, and the description of the corresponding component is the same as described above.

Steps 2 to 3: Micronization and Neutralization Steps

Next, a step of micronizing the hydrogel polymer in the presence of a surfactant to prepare a mixture including the micronized hydrogel polymer (Step 2) is included.

The above-described micronization step is a step of micronizing the polymer in the presence of a surfactant, and is a step in which micronization and aggregation of the polymer into a size of tens to hundreds of micrometers are simultaneously performed, rather than chopping the polymer to a millimeter size.

That is, it is a step of imparting appropriate adhesiveness to the polymer, thereby preparing secondary aggregated particles in the shape in which primary particles micronized to a size of tens to hundreds of micrometers are aggregated. Hydrous super absorbent polymer particles, which are the secondary aggregated particles prepared in the above-described step have a normal particle size distribution and a greatly increased surface area, so that the absorption rate may be significantly improved.

If ultra-fine pulverization is performed at a rotation speed of 500 rpm to 4,000 rpm by applying high-intensity mechanical shearing force in the micronization step, it is possible to form aggregated hydrogel particles having finer micropores.

At this time, if ultra-fine pulverization is performed at a rotation speed of 500 rpm to 4,000 rpm, high-intensity mechanical shearing force is applied, so that micropores of 100 μm or less are easily formed on the polymer, and accordingly, the surface roughness is increased, and the total surface area of the polymer is significantly increased by the pores formed inside and outside the polymer particles. Since the micropores are formed in a shape having stability compared to pores formed using a foaming agent in the polymerization step, the degree of fine powder generation due to the corresponding pores may be significantly reduced in the following process. Super absorbent polymer particles prepared in the above-described step have a significantly increased surface area, so that the absorption rate may be significantly improved, and accordingly, it is suitable to implement such that the super absorbent polymer of the present disclosure has a constant value of the change in slip strain according to the degree of swelling.

The ultra-fine pulverization process is performed at a rotation speed of 500 rpm to 4,000 rpm, and if the rotation speed of the above-described process is less than 500 rpm, it is difficult to form sufficient pores to a desired degree, so that it is difficult to expect quick vortex time, and it is difficult to secure a desired level of productivity. In addition, if the rotation speed is greater than 4,000 rpm, polymer chains may be damaged due to excessive shearing force, and accordingly, the content of extractable contents is increased, so that overall physical properties of a prepared super absorbent polymer may be slightly degraded. Preferably, the ultra-fine pulverization process may be performed at 1,000 rpm to 3,500 rpm, or 2,000 rpm to 3,000 rpm. In the above-described range, it is easy to form desired micropores without any problem described above.

According to an aspect of the present disclosure, the micronization step is performed by a micronization device, and the micronization device may include a body part having a transfer space thereinside, in which a polymer is transferred, a screw member rotatably installed inside the transfer space to move a polymer, a drive motor providing a rotational driving force to the screw member, a cutter member installed in the body part and pulverizing the polymer, and a perforated plate discharging the polymer pulverized by the cutter member to the outside of the body part and having a plurality of holes.

At this time, the size of the hole provided in the perforated plate of the micronization device may be 1 mm to 25 mm, 5 mm to 20 mm, or 5 mm to 15 mm.

As described above, when the polymer mixed with the surfactant is micronized using the micronization device while controlling aggregation, a smaller particle size distribution is implemented, so that the following drying and pulverization processes may be performed under milder conditions, and accordingly, it is possible to improve the physical properties of the super absorbent polymer while preventing the generation of fine powder, and if the ultra-fine pulverization is performed, appropriate micropores are simultaneously formed on the surface of the polymer, so that absorption rate may be improved through the improvement in the surface area.

The micronization step may be performed one or more times, and preferably, may be performed 1 time to 6 times, 1 time to 4 times, or 1 time to 3 times. The above-described step may be performed using a plurality of micronization devices, or may be performed using a single micronization device including a plurality of perforated plates and/or a plurality of cutter members, or some devices of the plurality of micronization devices may include a plurality of perforated plates and/or a plurality of cutter members.

According to an aspect of the present disclosure, a surfactant may be additionally used in the above-described micronization step, and accordingly, aggregation between polymer particles may be effectively controlled to lower the load of the device used in the pulverization process, so that productivity may be further improved.

Preferably, the surfactant may be a compound represented by Formula 2 below or a salt thereof, but the present disclosure is not limited thereto.

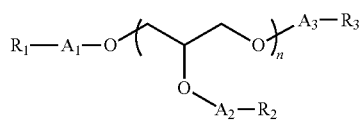

[Formula 2]

In Formula 2 above, $A_1$, $A_2$, and $A_3$ are each independently a single bond, carbonyl,

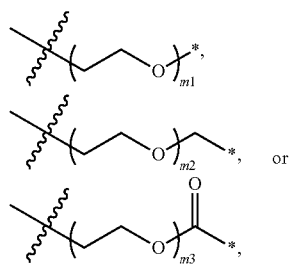

or but one or more thereof is carbonyl or

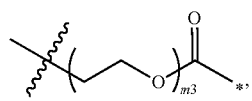

wherein m1, m2, and m3 are each independently an integer of 1 to 8,

is connected to each of adjacent oxygen atoms, and

is connected to each of adjacent $R_1$, $R_2$, and $R_3$, $R_1$, $R_2$, and $R_3$ are each independently hydrogen, a linear-chain or branched-chain alkyl having 6 to 18 carbon atoms, or a linear-chain or branched-chain alkenyl having 6 to 18 carbon atoms, and n is an integer of 1 to 9.

The surfactant is mixed with the polymer and added such that the micronization step is facilitated without aggregation.

The surfactant represented by Formula 2 above is a nonionic surfactant, and has excellent surface adsorption performance by hydrogen binding force even with an unneutralized polymer, and thus, is suitable to implement a desired aggregation control effect. On the other hand, in the case of an anionic surfactant, not a nonionic surfactant, when mixed with a polymer neutralized with a neutralizing agent such as NaOH and $Na_2SO_4$, the anionic surfactant is adsorbed using $Na^+$ ions ionized in a carboxyl group substituent of the polymer as a medium, and when mixed with a unneutralized polymer, there is a problem in that the adsorption efficiency with respect to the polymer is relatively degraded due to competition with anions of a carboxyl group substituent of the polymer.

Specifically, in the surfactant represented by Formula 2 above, a hydrophobic functional group is a $R_1$, $R_2$, or $R_3$ part (if not hydrogen), which is a terminal functional group, and a hydrophilic functional group further includes a glycerol-derived part in the chain, and a hydroxyl group at the terminal (if $A_n$ is a single bond, and at the same time, $R_n$ is hydrogen, n=1 to 3), wherein the glycerol-derived part and the hydroxyl group at the terminal are hydrophilic functional groups, which serve to improve adsorption performance with respect to the polymer surface. Accordingly, it is possible to effectively suppress aggregation of super absorbent polymer particles.

In Formula 2 above, $R_1$, $R_2$, and $R_3$ parts (if not hydrogen), which are hydrophobic functional groups, are each independently a linear-chain or branched-chain alkyl having 6 to 18 carbon atoms, or a linear-chain or branched-chain alkenyl having 6 to 18 carbon atoms. At this time, if $R_1$, $R_2$, or $R_3$ part (if not hydrogen) is alkyl or alkenyl having less than 6 carbon atoms, there is a problem in that aggregation of pulverized particles is not effectively controlled due to a short chain length, and if $R_1$, $R_2$, or $R_3$ part (if not hydrogen) is alkyl or alkenyl having greater than 18 carbon atoms, the mobility of the surfactant is reduced, and thus, the surfactant may not be effectively mixed with the polymer, and due to an increase in the cost of the surfactant, there may be a problem in that the unit cost of the composition increases.

Preferably, $R_1$, $R_2$, or $R_3$ is hydrogen, or in the case of a linear-chain or branched-chain alkyl having 6 to 18 carbon atoms, it may be 2-methylhexyl, n-heptyl, 2-methylheptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, or n-octadecanyl, or in the case of a linear-chain or branched-chain alkenyl having 6 to 18 carbon atoms, it may be 2-hexenyl, 2-heptenyl, 2-octenyl, 2-nonenyl, n-dekenyl, 2-undekenyl, 2-dodekenyl, 2-tridekenyl, 2-tetradekenyl, 2-pentadekenyl, 2-hexadekenyl, 2-heptadekenyl, or 2-octadekenyl.

The surfactant may be selected from compounds represented by Formula 2-1 to Formula 2-14 below, but is not limited thereto.

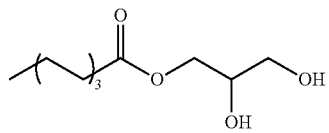

[Formula 2-1]

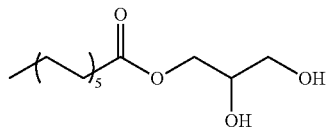

[Formula 2-2]

[Formula 2-3]
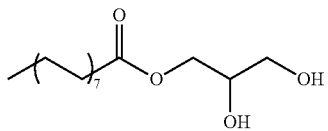

[Formula 2-4]
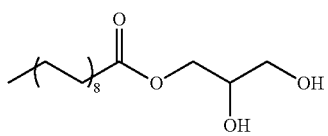

[Formula 2-5]
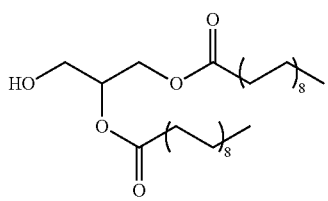

[Formula 2-6]
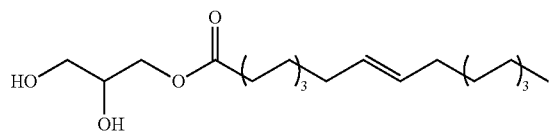

[Formula 2-7]
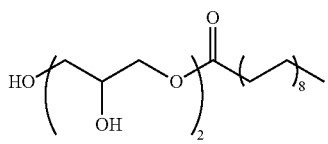

[Formula 2-8]
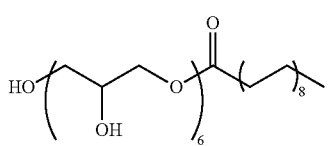

[Formula 2-9]
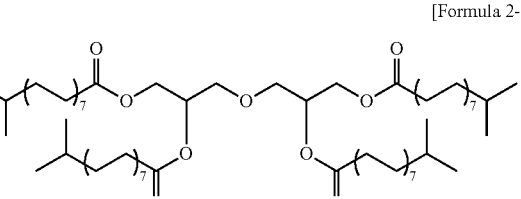

[Formula 2-10]
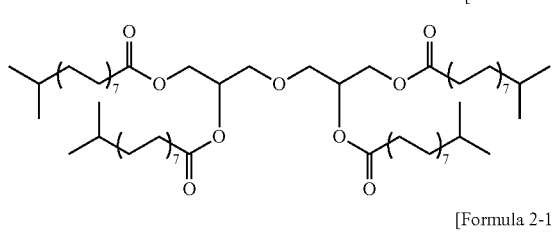

[Formula 2-11]
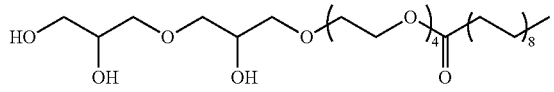

[Formula 2-12]
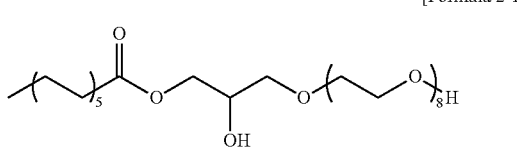

[Formula 2-13]
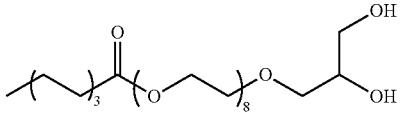

[Formula 2-14]
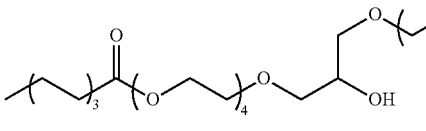

The amount of the surfactant to be used is not particularly limited, but the surfactant may be used in an amount of 0.06 g to 0.48 g per 1,000 g of the hydrogel polymer depending on productivity securing or the load of a device.

If the surfactant is used too little, the surfactant is not evenly adsorbed onto the surface of the polymer, so that particles may re-aggregated after pulverization, or due to much sharing between the surfactant and the polymer, absorption performance such as centrifuge retention capacity and absorbency under pressure may be degraded. Meanwhile, if the surfactant is used too much, due to a decrease in surface tension, the overall physical properties of a finally prepared super absorbent polymer may be degraded.

Therefore, for example, the surfactant may be used in an amount of 0.06 g or more, 0.1 g or more, or 0.2 g or more, and 0.48 g or less, 0.45 g or less, or 0.4 g or less per 1,000 g of the hydrogel polymer. In this case, it is suitable to control such that the super absorbent polymer has a constant value of the change in slip strain according to the degree of swelling.

A method for mixing a surfactant with a polymer is not particularly limited as long as it is a method capable of evenly mixing the surfactant with the polymer, and may be appropriately adopted and used. Specifically, the surfactant may be mixed in a dry manner, or dissolved in a solvent and then mixed in a solution state, or the surfactant may be melted and then mixed.

Among the above, the surfactant may be, for example, mixed in a solution state of being dissolved in a solvent. At this time, as the solvent, all types of solvents may be used whether it is an inorganic solvent or organic solvent, but considering the ease of a drying process and the cost of a solvent recovery system, water is most suitable. In addition, the solution may be prepared by mixing the surfactant and the polymer in a reaction tank, putting the polymer in a mixer and spraying the solution thereon, or mixing the polymer and the solution by continuously supplying the same to a continuously operating mixer.

If the surfactant is mixed in a solution state of being dissolved in water, the surfactant may be diluted as an aqueous solution having a concentration of about 0.01% to 90% and used.

For example, if the surfactant is to be used in an amount of 0.1 g per 1,000 g of the hydrogel polymer, 100 g of an aqueous solution having a concentration of 0.1% may be used by dissolving 0.1 g of the surfactant in 99.9 g of water. Alternatively, 10 g of an aqueous solution having a concentration of 1% may be used by dissolving 0.1 g of the surfactant in 9.9 g of water.

That is, if the same amount of the surfactant is used, the water content may be adjusted to prepare an aqueous solution with a desired concentration, and the concentration may be appropriately adjusted in consideration of the physical properties of a super absorbent polymer to be finally prepared.

According to an aspect of the disclosure, a step of neutralizing at least a portion of the acid group of the polymer (Step 3) is performed, and the above-described micronization of Step 2 and the neutralization of Step 3 may be performed sequentially, alternately, or simultaneously.

That is, a neutralizing agent may be introduced to a polymer to polymerize the acid group first, and then a surfactant may be introduced to the polymerized polymer to micronize the polymer mixed with the surfactant (perform in the order of Step 3→Step 2), or a neutralizing agent and a surfactant may be simultaneously introduced to a polymer to neutralize and micronize the polymer (simultaneously perform Steps 2 and Step 3). Alternatively, a surfactant may be introduced first and then a neutralizing agent may be introduced later (perform in the order of Step 2→Step 3). Alternatively, a neutralizing agent and a surfactant may be alternately introduced. Alternatively, a surfactant may be introduced first for micronization, and then a neutralizing agent may be introduced for neutralization, and additionally, a surfactant may be further added to the neutralized hydrogel polymer to further perform the micronization process.

Here, if the neutralization is separately performed independently from the micronization of Step 2, the neutralization may be performed in such a manner that an additive is introduced while the polymer is being pulverized. More specifically, a screw-type extruder including a perforated plate having a plurality of holes may be used. The screw-type extruder is a device in which pulverization is performed in a mild condition compared to the micronization device used in the micronization step described above, and the rotation speed of the extruder may be about 150 rpm to about 500 rpm, and the hole of the perforated plate may be about 3 mm to 25 mm in size, but the present disclosure is not limited thereto.

The rotation speed of the screw-type extruder and the hole size of the perforated plate affect the discharge state of a super absorbent polymer discharged from the extruder, and depending on the discharge state, the particle shape of the super absorbent polymer may change.

Particularly, by adjusting the rotation speed of the screw-type extruder at 150 rpm to 500 rpm, it is possible to control such that the super absorbent polymer has a constant value of the change in slip strain according to the degree of swelling.

At this time, as the neutralizing agent, a basic material such as sodium hydroxide, potassium hydroxide, ammonium hydroxide, or the like, which is capable of neutralizing an acid group, may be used.

In addition, the degree of neutralization which refers to the degree of neutralization of an acid group included in the polymer by the neutralizing agent may be 50 mol % to 90 mol %, 60 mol % to 85 mol %, 65 mol % to 85 mol %, or 65 mol % to 80 mol %. The range of the degree of neutralization may vary depending on final physical properties, and by adjusting the degree of neutralization, it is possible to adjust absorption rate and absorption performance.

At this time, if the degree of neutralization is too high, the absorbency of the super absorbent polymer may decrease, and the concentration of the carboxyl group on the surface of the particle is too low, making it difficult to properly perform surface cross-linking in a subsequent process, so that absorption properties under pressure or permeability may be reduced. On the other hand, if the degree of neutralization is too low, the polymer may have significantly reduced absorption power, and may exhibit the same property as that of elastic rubber, which is difficult to handle.

In order to neutralize the entire polymer evenly, it may be preferable to leave a certain time lag between the introduction of the neutralizing agent and the micronization process.

Step 4: Drying Step

Next, a step (Step 4) of drying the micronized and neutralized polymer to prepare base polymer powder is performed.

The above-described step is a step in which at least a portion of an acid group of a polymer is neutralized, and moisture of the base polymer powder, which is a polymer obtained by micronizing the polymer, is dried.

In a typical method for preparing a super absorbent polymer, the drying step is performed such that the moisture content of base polymer powder is to be about 4 wt % to 20 wt %, about 4 wt % to about 15 wt %, or about 6 wt % to about 13 wt %. However, the present disclosure is not limited thereto.

Step 4 above may be performed by fixed-bed type drying, moving type drying, or a combination thereof.

According to an aspect of the disclosure, Step 4 above may be performed by fixed-bed type drying.

The fixed-bed type drying refers to a method in which a material to be dried is suspended on a floor such as a perforated iron plate which allows air to pass through, and then hot air passes through the material from the bottom to the top to dry the material.

The fixed-bed type drying performs drying in a plate-shape manner without the flow of particles, so that it is difficult to achieve uniform drying with a simple flow of hot air. Therefore, the fixed-bed type drying may include a delicate adjustment of hot air and temperature in order to obtain a dried body with a uniform high moisture content. In the present disclosure, through a method of changing the direction of hot air from downward to upward, a plate-shaped dried body is prevented from bending during drying, thereby preventing the hot air from escaping. In addition, the drying temperature was changed for each section to adjust the upper layer-middle layer-lower layer inside the dried body to be uniformly dried with a moisture content deviation of 5% or less.

As a device capable of performing drying by the fixed-bed type drying, a belt-type dryer or the like may be used, but the present disclosure is not limited thereto.

In the case of the fixed-bed type drying step, the drying process may be performed at a temperature of about 80° C. to about 200° C., preferably 90° C. to 190° C. or 100° C. to 180° C. If the drying temperature is below 80° C., the drying time may become excessively long, and if the drying temperature is excessively high, which is above 200° C., a super absorbent polymer having a moisture content lower than a desired moisture content may be obtained. The drying temperature may mean the temperature of hot air which is used or the internal temperature of a device during the drying process.

According to an aspect of the present disclosure, Step 4 above may be performed by moving type drying.

The moving type drying refers to a method of drying a dried body by mechanically stirring the same during drying. At this time, the direction in which hot air passes through a material may be the same as or different from the circulation direction of the material. Alternatively, the material may be dried by circulating inside a dryer and passing through a heat medium fluid (heat oil) from a separate pipe outside the dryer.

As a device capable of performing drying by the above-described moving type drying, a horizontal-type mixer, a rotary kiln, a paddle dryer, a steam tube dryer, a moving type drier commonly used, or the like may be used.

In the case of the moving type drying step, the drying process may be performed at a temperature of about 100° C. to about 300° C., preferably 120° C. to 280° C. or 150° C. to 250° C. If the drying temperature is excessively low, which is below 100° C., the drying time may become excessively long, and if the drying temperature is excessively high, which is above 300° C., super absorbent polymer chains may be damaged, which may degrade the overall physical properties, and also, a super absorbent polymer having a moisture content lower than a desired water content may be obtained.

Step 5: Pulverization Step

Next, a step of pulverizing the dried base polymer powder is performed.

Specifically, the pulverization step may be performed by pulverizing the dry base polymer powder to have a particle size of normal particle level, i.e., a particle diameter of 150 μm to 850 μm.

A pulverizer to be used for the above-described purpose may specifically be a vertical pulverizer, a turbo cutter, a turbo grinder, a rotary cutter mill, a cutter mill, a disc mill, a shred crusher, a crusher, a chopper, a disc cutter, or the like, but is not limited to the above-described examples.

Alternatively, as the pulverizer, a pin mill, a hammer mill, a screw mill, a roll mill, a disc mill, a jog mill, or the like may be used, but the pulverizer is not limited to the above-described examples.

In the preparation method of the present disclosure, super absorbent polymer particles having a small particle size distribution may be implemented in the micronization step compared to a typical chopping step, and since the moisture content is maintained relatively high after drying, even if pulverization is performed under mild conditions with relatively low pulverization power, a super absorbent polymer having a very high content of particles with a normal particle size of 50 μm to 850 μm may be obtained, and the fine powder generation rate may be greatly reduced.

The super absorbent polymer particles prepared as described above may include super absorbent polymer particles having a particle size of 150 μm to 850 μm, i.e., normal particles, in an amount of 80 wt % or greater, 85 wt % or greater, 89 wt % or greater, 90 wt % or greater, 92 wt % or greater, 93 wt % or greater, 94 wt % or greater, or 95 wt % or greater based on the total weight. The particle size of the above-described polymer particles may be measured according to the method of EDANA WSP 220.3 of the European Disposables and Nonwovens Association (EDANA) standards.

In addition, the super absorbent polymer particles may contain fine powder having a particle diameter of less than 150 μm in an amount of about 20 wt % or less, about 18 wt % or less, about 15 wt % or less, about 13 wt % or less, about 12 wt % or less, about 11 wt % or less, about 10 wt % or less, about 9 wt % or less, about 8 wt % or less, or about 5 wt % or less based on the total weight. This is in contrast to having fine powder in an amount of greater than about 20 wt % to about 30 wt % when a super absorbent polymer is prepared according to a typical preparation method.

Additive Introduction Step

According to an aspect of the disclosure, prior to the drying step (Step 4), a step of introducing an additive to the micronized and neutralized polymer may be further included.

The process of introducing an additive is a process for improving physical properties by using an additional additive within a range in which a desired effect is not inhibited, and the type of the additive is not particularly limited, wherein, for example, a polymerization initiator for removing residual monomers, a permeability enhancer for improving absorption properties, a fine powder anti-caking agent for recirculating generated fine powder, a fluidity enhancer, an antioxidant, a neutralizing agent, a surfactant, and the like may be used, but the additive is not limited thereto.

The additive introduction step may be performed simultaneously with Step 2, simultaneously with Step 3, after Step 2 and Step 3, or in at least one of the above-described steps. The additive introduction step may be performed a plurality of times if necessary, and may also be performed one or more times in each step.

If the additive introduction step is separately performed independently from Step 2 and Step 3, that is, if performed after Step 2 and Step 3 and before Step 4, the additive introduction step may be performed in a manner in which an additive is introduced while the polymer is being pulverized.

The pulverization of Step 5 described above may be equally applied to the pulverization above, and in the pulverization step, an additive may be introduced once or a plurality of times and mixed with the polymer.

Classification Step

Next, after the step of pulverizing the base polymer powder (Step 5), a step of classifying the pulverized super absorbent polymer particles according to the particle size may be further included.

Surface Cross-Linking Step

In addition, a step of forming a surface cross-linked layer on at least a portion of the surface of the base polymer particle in the presence of a surface cross-linking agent after pulverizing (Step 5) and/or classifying the base polymer powder may be further included. By the above-described step, a cross-linked polymer included in the base polymer powder may be further cross-linked by means of the surface cross-linking agent, so that the surface cross-linked layer may be formed on at least a portion of the surface of the base polymer powder.

The same contents described above with reference to a surface cross-linking agent may be equally applied to the surface cross-linking agent.

In addition, there is no limitation on a method for mixing the surface cross-linking agent with the base polymer powder. For example, a method in which a composition including a surface cross-linking agent and base polymer powder is introduced into a reaction tank and mixed, a method in a surface cross-linking agent is sprayed on the composition, a method in which a polymer composition and a surface cross-linking agent are continuously supplied to a continuously operating mixer, and the like may be used.

When the surface cross-linking agent and the base polymer powder are mixed, water and methanol may be mixed together and additionally added thereto. If water and methanol are added, there is an advantage in that the surface cross-linking agent may be evenly dispersed in the polymer composition. At this time, the content of water and methanol added may be appropriately adjusted to induce even dispersion of the surface cross-linking agent, to prevent aggregation of the polymer composition, and to optimize the surface penetration depth of the cross-linking agent.

The surface cross-linking process may be performed at a temperature of about 80° C. to about 250° C. More specifically, the surface cross-linking process may be performed at a temperature of about 100° C. to about 220° C., or about 120° C. to about 200° C. for about 20 minutes to about 2 hours, or about 40 minutes to about 80 minutes.

When the above-described surface cross-linking process conditions are satisfied, the surface of the super absorbent polymer particles are sufficiently cross-linked, so that the absorbency under pressure may increase.

The means for raising the temperature for the surface cross-linking reaction is not particularly limited.

A heat medium may be supplied, or a heat source may be directly supplied for heating. At this time, the types of the heat medium that can be used may include steam, hot air, and a heated fluid such as hot oil, but are not limited thereto, and the temperature of a supplied heat medium may be appropriately selected in consideration of the means of the heat medium, the temperature raising rate, and the temperature raising target temperature. The heat source that can be directly supplied may include heating through electricity, or heating through gas, but is not limited to the above-described examples.

Post-Treatment Step

According to an aspect of the present disclosure, after the step of forming the surface cross-linked layer on at least a part of the surface of the base polymer powder, the method may be performed by further including any one or more steps among a cooling step of cooling the super absorbent polymer particles having the surface cross-linking layer formed thereon, an adding-water step of adding water to the super absorbent polymer particles having the surface cross-linked layer formed thereon, and a post-treatment step of introducing an additive to the super absorbent polymer particles having the surface cross-linked layer formed thereon. At this time, the cooling step, the adding-water step, and the post-treatment step may be performed sequentially or simultaneously.

In the adding-water step, water or salt water may be used, through which the amount of remnants generated may be controlled. The amount of water to be used may be appropriately adjusted in consideration of a desired moisture content of a final product, and preferably, the water may be used in an amount of 0.1 wt % to 10 wt %, 0.5 wt % to 8 wt %, or 1 wt % to 5 wt % based on the absorbent polymer, but is not limited thereto.

In addition, after the adding-water step, an aging step may be further performed.

If salt water is used in the adding-water step, due to the conductivity of the salt water, the solution absorption rate relatively decreases, which allows the salt water to evenly spread during the aging step, thereby making it possible to achieve even absorption with respect to the absorbent polymer. In the aging step, a commonly used method may be applied without particular limitation, and for example, the aging step may be performed at 100° C. or lower, 80° C. or lower, preferably at 50° C. or lower for 10 minutes to 1 hour using a rotary stirring facility.

The additive introduced in the post-treatment step may be a surfactant, an inorganic salt, a permeability enhancer, an anti-caking agent, a fluidity enhancer, an antioxidant, and the like, but the present disclosure is not limited thereto.

By selectively performing the cooling step, the adding-water step, and the post-treatment step, the moisture content of a final super absorbent polymer may be increased by controlling the generation of remnants, and a high-quality super absorbent polymer product may be prepared.

The description of the method for preparing a super absorbent polymer according to the present disclosure may be applied to the above-described super absorbent polymer of the present disclosure.

Hereinafter, through specific aspects of the present disclosure, actions and effects of the present disclosure will be described in more detail. However, these aspects are only presented as examples of the present disclosure, and the scope of the present disclosure is not limited thereby.

EXAMPLES

Example 1

(Step 1: Polymer Preparation Step)

In a 5 L glass container equipped with a stirrer and a thermometer, 1500 g of acrylic acid, and as an internal cross-linking agent, 5.25 g of pentaerythritol triallyl ether (PETTAE), and 3404 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,500 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 4 g of water, 6 g of methanol, 0.15 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 µm to 850 µm.

Example 2

(Step 1: Polymer Preparation Step)

In a 5 L glass container equipped with a stirrer and a thermometer, 1400 g of acrylic acid, and as an internal cross-linking agent, 4.9 g of pentaerythritol triallyl ether (PETTAE), and 3512 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 28.0 g of 0.3% hydrogen peroxide aqueous solution, 14.0 g of 1% ascorbic acid aqueous solution, and 42.0 g of 2% 2,2'-azobis-(2-amidinopropane) dihydrochloric acid aqueous solution were introduced thereinto, and at the same time, as a reducing agent, 21.0 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,200 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 µm to 850 µm.

(Surface Cross-Linking Step)

Next, per 100 g of the base polymer powder, a surface cross-linking agent aqueous solution containing 3.5 g of water, 6 g of methanol, 0.07 g of ethylene glycol diglycidyl ether (EJ-10305), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 µm to 850 µm.

Example 3

(Step 1: Polymer Preparation Step)

In a 5 L glass container equipped with a stirrer and a thermometer, 1500 g of acrylic acid, and as an internal cross-linking agent, 3.75 g of pentaerythritol triallyl ether (PETTAE), and 3400 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

50 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1396 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).
(Step 4: Drying Step)
1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.
(Step 5: Pulverization and Classification Step)
The dried body was pulverized using a pulverizer (GRAN-U-LIZER™, MPE), and then classified using a standard mesh sieve of the ASTM standards to obtain base polymer powder having a size of 150 μm to 850 μm.
(Surface Cross-Linking Step)
Next, per 100 g of the base polymer powder, a surface cross-linking agent aqueous solution containing 5 g of water, 6 g of methanol, 0.1 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.
After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 1

(Step 1: Polymer Preparation Step)
A polymer was obtained in the same manner as in Example 1.
(Steps 2 to 3: Micronization and Neutralization Steps)
597 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,500 rpm to perform a micronization process.
Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).
(Step 4: Drying Step)
1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.
(Step 5: Pulverization and Classification Step)
The dried body was pulverized using a pulverizer (GRAN-U-LIZER™, MPE), and then classified using a standard mesh sieve of the ASTM standards to obtain base polymer powder having a size of 150 μm to 850 μm.
(Surface Cross-Linking Step)
Next, per 100 g of the base polymer powder, a surface cross-linking agent aqueous solution containing 5.5 g of water, 6 g of methanol, 0.15 g of ethylene glycol diglycidyl ether (EJ-1030S), and 0.3 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.
After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 2

(Step 1: Polymer Preparation Step)
A polymer was obtained in the same manner as in Example 1.
(Steps 2 to 3: Micronization and Neutralization Steps)
100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,200 rpm. Thereafter, the mixture was further pushed into a perforated plate with a plurality of 10 mm holes at a rotational speed of 1,000 rpm to obtain a hydrogel polymer in the form of pulverized gel.
Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).
(Step 4: Drying Step)
1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.
(Step 5: Pulverization and Classification Step)
The dried body was pulverized using a pulverizer (GRAN-U-LIZER™, MPE), and then classified using a standard mesh sieve of the ASTM standards to obtain base polymer powder having a size of 150 μm to 850 μm.
(Surface Cross-Linking Step)
Next, per 100 g of the base polymer powder, a surface cross-linking agent aqueous solution containing 5.5 g of water, 5 g of methanol, and 0.07 g of ethylene glycol diglycidyl ether (EJ-1030S) was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.
After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 3

(Step 1: Polymer Preparation Step)
A polymer was obtained in the same manner as in Example 2.
(Steps 2 to 3: Micronization and Neutralization Steps)
150 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,000 rpm to perform a micronization process.
Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)
1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.
(Step 5: Pulverization and Classification Step)
The dried body was pulverized using a pulverizer (GRAN-U-LIZER™, MPE), and then classified using a standard mesh sieve of the ASTM standards to obtain base polymer powder having a size of 150 μm to 850 μm.
(Surface Cross-Linking Step)
Next, per 100 g of the base polymer powder, a surface cross-linking agent aqueous solution containing 5 g of water, 6 g of methanol, 0.15 g of ethylene carbonate, and 0.38 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 185° C. for 50 minutes to obtain a surface cross-linked super absorbent polymer.
After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 4

(Step 1: Polymer Preparation Step)
A polymer was obtained in the same manner as in Example 2.
(Steps 2 to 3: Micronization and Neutralization Steps)
100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 1,100 rpm to perform a micronization process.
Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).
(Step 4: Drying Step)
The hydrous super absorbent polymer particles were uniformly dried in the same manner as in Example 1 to obtain a dried body.

(Step 5: Pulverization and Classification Step)

The polymer dried in Step 4 above was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 4 g of water, 6 g of methanol, 0.15 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Experimental Example 1

A slip strain (%) of the super absorbent polymer of Example 1 was obtained according to the following steps, and an absolute value of the rate of change in the slip strain according to the degree of swelling (%) was calculated.

Step 1) Preparation of Super Absorbent Polymer Dilution Sample

A super absorbent polymer sample (30 to 50 Mesh) was sieved, and the sieved super absorbent polymer sample was weighed to obtain 0.5 g thereof, which was sufficiently swelled in a 0.9% NaCl solution for 1 hour or more.

At this time, the degree of swelling was varied, and based on the centrifuge retention capacity (CRC) of a super absorbent polymer as measured in advance according to EDANA WSP 241.3, the degree of swelling at the time when a solution in accordance with the CRC was added was set to 100%, and samples in which the super absorbent polymer was subjected to each of 30%, 50%, and 70% swelling were prepared.

Step 2) Derivation of Slip Strain of Super Absorbent Polymer 2.5 g of the swollen super absorbent polymer sample was placed in a rheometer (ARES-G2 of TA Co., Ltd.) which used a parallel plate having a diameter of 25 mm, and subjected to amplitude sweep to measure a storage modulus while increasing a strain.

Specifically, the strain was increased from 0.01% to 100% under a frequency of 1 Hz and a temperature of 25° C.

When a measurement sample becomes increasingly deformed as shown in the FIGURE during the amplitude sweep, the viscoelasticity is measured uniformly in a linear region, but when deformed to a predetermined degree or more, inter-particle slip occurs outside the linear region between strain-stress, so that the viscoelasticity is not measured normally, and as a result, the storage modulus rapidly decreases (a nonlinear region).

At this time, a value at the time when the storage modulus rapidly decreases from the linear region to the nonlinear region is defined as a slip strain (%), and the slip strain was measured three times and the average value thereof was adopted as a slip strain value.

Specifically, the slip strain value was obtained by using an Endset function of a measurement program (Trios of TA Co., Ltd.), and the value at the time when the storage modulus rapidly decreases from the linear region to the nonlinear region means a crossing point of a section in which the modulus is constant and a section in which the modulus rapidly decreases (slope of the last 2 points).

The slip strain of the samples in which the super absorbent polymer was subjected to each of 30%, 50%, and 70% swelling was derived by the method described above, and the rate of change in slip strain according to the degree of swelling (%) was calculated by Equation 1 to Equation 3 below.

Rate of change in slip strain at 30% and 70% swelling=[{(slip strain at 70% swelling)−(slip strain at 30% swelling)}/40]  [Equation 1]

Rate of change in slip strain at 30% and 50% swelling=[{(slip strain at 50% swelling)−(slip strain at 30% swelling)}/20]  [Equation 2]

Rate of change in slip strain at 50% and 70% swelling=[{(slip strain at 70% swelling)−(slip strain at 50% swelling)}/20]  [Equation 3]

TABLE 1

| | Slip Strain (%) average according to swelling degree (30%, 50%, 70%) | | | 30% to 50% Absolute value of change rate | 50% to 70% Absolute value of change rate | 30% to 70% Absolute value of change rate |
|---|---|---|---|---|---|---|
| | 30% | 50% | 70% | | | |
| Example 1 | 10.62 | 11.04 | 11.21 | 0.021 | 0.009 | 0.015 |
| Example 2 | 11.69 | 11.80 | 11.95 | 0.005 | 0.007 | 0.006 |
| Example 3 | 11.02 | 11.25 | 11.76 | 0.012 | 0.026 | 0.019 |
| Comparative Example 1 | 12.56 | 9.87 | 9.03 | 0.134 | 0.042 | 0.088 |
| Comparative Example 2 | 12.74 | 11.10 | 10.26 | 0.082 | 0.042 | 0.062 |
| Comparative Example 3 | 13.51 | 12.42 | 11.26 | 0.054 | 0.058 | 0.056 |
| Comparative Example 4 | 12.74 | 10.84 | 10.86 | 0.095 | 0.001 | 0.047 |

<Experimental Example 2>—Evaluation of Physical Properties

The super absorbent polymers prepared in Examples and Comparative Examples were evaluated for physical properties by the following methods and the results are shown in Table 2 and Table 3 below.

Unless otherwise stated, the following evaluation of physical properties was all conducted at constant temperature/humidity (23±1° C., relative humidity 50±10%), and physiological saline or brine refers to 0.9 wt % sodium chloride (NaCl) aqueous solution.

A sample to be measured was left to stand under constant temperature/humidity conditions for 24 hours, and was evaluated for each physical property.

(1) Measurement of Gel Strength

The super absorbent polymers prepared in Examples and Comparative Examples were evaluated for gel strength by the following method.

Brine and ascorbic acid (ACS) were used to prepare brine having 0.005% ASC. Subsequently, the brine having 0.005% ASC and approximately 2.5 (2.5±0.01 g) of the super absorbent polymer were introduced into a 100 ml beaker and mixed, and the beaker was sealed with clear wrap, and then placed in an oven to be allowed to swell for 24 hours at a temperature of 40° C. Thereafter, the clear wrap was removed from the beaker taken out of the oven, and the beaker was left to stand at room temperature for 30 minutes, and then gel strength of the super absorbent polymer was measured using a tensile compression tester (manufacturer: Nidec-Shimpo).

(2) Centrifuge Retention Capacity (CRC, g/g)

The centrifuge retention capacity of the super absorbent polymer of each of Examples and Comparative Examples by absorption magnification under no load was measured in accordance with the European Disposables and Nonwovens Association (EDANA) standard EDANA WSP 241.3.

As described in the EDANA WSP 241.0, the measurement was performed at a temperature of 23±2° C. and a relative humidity of 45±15%.

Specifically, a super absorbent polymer $W_0$ (g) (about 0.2 g) obtained through each of Examples and Comparative Examples was uniformly placed in a nonwoven fabric bag and sealed, and then immersed in physiological saline (0.9 wt %) at room temperature. After 30 minutes, the bag was drained for 3 minutes under the condition of 250 G using a centrifugal separator, and a weight $W_2$ (g) of the bag was measured. In addition, the same operation was performed without using a polymer, and then a weight $W_1$ (g) at that time was measured.

CRC(g/g) was calculated according to Equation 5 below using each obtained weight.

$$CRC\ (g/g)=\{[W_2(g)-W_1(g)]/W_0(g)\}-1 \qquad [\text{Equation 5}]$$

The above-described measurement was repeated 5 times, and an average value and a standard deviation were obtained.

(3) Absorbency Under Pressure (AUP, g/g)

The absorbency under pressure of 2.07 kPa (0.3 psi) of the super absorbent polymer of each of Examples and Comparative Examples was measured according to the method of EDANA WSP 242.3.

As described in the EDANA WSP 242.0, the measurement was performed at a temperature of 23±2° C. and a relative humidity of 45±15%.

Specifically, a 400-mesh wire made of stainless steel was mounted on the bottom of a plastic cylinder having an inner diameter of 25 mm. Under the conditions of room temperature and a humidity of 50%, a super absorbent polymer $W_3$ (g) (0.9 g) was evenly sprayed on the wire mesh, and a piston capable of further applying a load of 2.07 kPa (0.3 psi) evenly thereon was installed to be slightly smaller than an outer diameter of 25 mm, to have no gap with an inner wall of the cylinder, and to have no disturbance of an upward and downward movement. At this time, a weight $W_4$ (g) of the above-described device was measured.

A glass filter having a diameter of 90 mm and a thickness of 5 mm was placed on the inside of a petri dish having a diameter of 150 mm, and physiological saline composed of 0.9 wt % sodium chloride was set to the same level as the upper surface of the glass filter. One sheet of filter paper having a diameter of 90 mm was placed thereon. The measurement device was placed on the filter paper, and a liquid was absorbed under a load for 1 hour. After 1 hour, the measurement device was lifted, and a weight $W_5$ (g) thereof was measured.

Absorbency under pressure (g/g) was calculated according to Equation 6 below using each obtained weight.

$$AUP(g/g)=[W_5(g)-W_4(g)]/W_3(g) \qquad [\text{Equation 6}]$$

The above-described measurement was repeated 5 times, and an average value and a standard deviation were obtained.

(4) Vortex Time

The vortex time of the reference super absorbent polymer of each of Examples and Comparative Examples was measured by the following method.

1) First, 50 mL of 0.9% salt water was added to a 100 mL beaker having a flat bottom using a 100 mL mass cylinder.

2) Next, the beaker was placed in the center of a magnetic stirrer, and a circular magnetic bar (diameter 30 mm) was placed inside the beaker.

3) Thereafter, the stirrer was operated such that the magnetic bar was stirred at 600 rpm, and the lowest portion of a vortex generated by the stirring was brought into contact with the top of the magnetic bar.

4) After confirming that the temperature of the salt water in the beaker reached 24.0° C., 2±0.01 g of a super absorbent polymer sample was introduced thereinto and simultaneously, a stop watch was operated, and the time until the vortex disappeared and the surface of the liquid became completely horizontal was measured in seconds, which was set to vortex time.

(5) Measurement of Permeability of Super Absorbent Polymer

The permeability was measured for each polymer through Equation 4 below.

$$\text{Perm}=[20\ \text{mL}/T1\ (\text{second})]\times 60\ \text{seconds} \qquad [\text{Equation 4}]$$

In Equation 4 above, Perm is permeability, and T1 indicates time (seconds) taken for 20 mL of physiological saline to pass through a swollen super absorbent polymer under a pressure of 2.07 kPa (0.3 psi) after adding 0.2 g of a super absorbent polymer into a cylinder, pouring physiological saline (0.9 wt % sodium chloride aqueous solution) thereinto such that the super absorbent polymer is completely submerged, thereby allowing the super absorbent polymer to be swollen for 30 minutes.

Specifically, a cylinder and a piston were prepared. A cylinder having an inner diameter of 20 mm, and provided with a glass filter and a stopcock at a lower end thereof was used as the cylinder. As the piston, a piston in which a screen having an outer diameter slightly smaller than 20 mm, thereby freely moving the cylinder up and down is disposed at a lower end, wherein a weight is disposed at an upper end, and the screen and the weight are connected by a rod. In the piston, a weight capable of applying a pressure of 2.07 kPa (0.3 psi) due to the addition of the piston was installed.

0.2 g of the super absorbent polymer was added in a state in which a stopcock of the cylinder was locked, and an excess amount of physiological saline (0.9 wt % sodium chloride aqueous solution) was poured thereinto such that the super absorbent polymer was completely submerged. Then, the super absorbent polymer was subjected to swelling for 30 minutes. Thereafter, the piston was added to uniformly impart a load of 2.07 kPa (0.3 psi) on the swollen super absorbent polymer.

Subsequently, the stopcock of the cylinder was opened to measure the time taken for 20 mL of physiological saline to pass through the swollen super absorbent polymer in seconds. At this time, if a meniscus is marked when the cylinder is filled with 40 mL of physiological saline, and a meniscus is marked when the cylinder is filled with 20 mL of the physiological saline, the time taken to reach a level corresponding to 20 mL from a level corresponding to 40 mL may be measured to easily measure the T1 of Equation 1 above.

(6) Content of Extractable Contents in Water Having Electrical Conductivity of 110 μS/cm The content of extractable contents was measured for the super absorbent polymer of each of Examples and Comparative Examples. The extractable contents were measured employing the method of EDANA WSP 270.2.

Specifically, among the super absorbent polymers prepared by the method according to each of Examples and Comparative Examples, 1.0 g of a sample having a particle diameter of 150 μm to 850 μm was placed in a 250 mL Erlenmeyer flask, and then placed in 200 mL of water having an electrical conductivity of 110 μS/cm and stirred at 250 rpm to be subjected to free swelling for (1 hour/16 hours), and then an aqueous solution was filtered through filter paper.

The filtered solution was primarily titrated to pH 10 with a 0.1 N caustic soda solution, and then back-titrated to pH 2.7 with a 0.1 N hydrogen chloride solution to calculate an uncross-linked polymer material from the amount required for neutralization as extractable contents (weight %).

(7) Absorbency in Water Having Electrical Conductivity of 110 μS/Cm

The absorbency of the super absorbent polymer of each of Examples and Comparative Examples in water having an electrical conductivity of 110 μS/cm was measured by the following method.

1) First, 1.0 g $W_n$ of the super absorbent polymer was placed in a nonwoven fabric bag (18 cm×28 cm) and immersed in 1000 mL of water having an electrical conductivity value of 110 μS/cm at 24° C. for (30 seconds/120 seconds).

2) After (30 seconds/120 seconds), the bag containing the swollen super absorbent polymer was taken out of the water having an electrical conductivity of 110 μS/cm, and then was hung and left to stand for 1 minute. Thereafter, a weight $W_{13}$ of the envelope was measured.

3) In addition, the same operation was performed without using a super absorbent polymer, and a weight $W_{12}$ at that time was measured.

4) Using each weight obtained as described above, the absorption capacity (g/g) in water having an electrical conductivity value of 110 μS/cm (30 seconds/120 seconds) was calculated according to Equation 7 below.

Absorbency in water having electrical conductivity value of 110 μS/cm=$\{[W_{13}(g)-W_{12}(g)-W_{11}(g)]/W_{11}(g)\}$ [Equation 7]

The measurement results of the absorbency of Examples and Comparative Examples in water having an electrical conductivity of 110 μS/cm are shown in Table 3 below.

(8) Average Absorption Rate for Each Section of Water Having Electrical Conductivity of 110 μS/Cm Using the results of 30-second absorbency and 120-second absorbency in water having an electrical conductivity of 110 μS/cm, the average absorption rate in the section between 0 second to 30 seconds and the average absorption rate in the section between 30 seconds to 120 seconds were calculated.

The measurement results of the absorption rate of Examples and Comparative Example according to the swelling section in water having an electrical conductivity of 110 μS/cm are shown in Table 3 below.

TABLE 2

|  | Gel strength (N) | CRC (g/g) | 0.3 AUP (g/g) | Vortex time (sec) | Permeability (mL/min) |
|---|---|---|---|---|---|
| Example 1 | 0.95 | 35.2 | 31.4 | 28 | 5.2 |
| Example 2 | 0.99 | 37.4 | 33.1 | 22 | 6.1 |
| Example 3 | 0.92 | 36.8 | 32.3 | 24 | 5.8 |
| Comparative Example 1 | 0.90 | 33.1 | 25.5 | 36 | 2.7 |
| Comparative Example 2 | 1.11 | 28.5 | 29.8 | 38 | 3.1 |
| Comparative Example 3 | 0.78 | 34.4 | 28.5 | 43 | 2.1 |
| Comparative Example 4 | 0.88 | 33.5 | 27.9 | 41 | 2.9 |

TABLE 3

|  | Content (%) of extractable contents in water having electrical conductivity of 110 μS/cm at 24° C. | | Absorbency (g/g) in water having electrical conductivity of 110 μS/cm at 24° C. | | Absorption rate (g/g/sec) in water having electrical conductivity of 110 μS/cm at 24° C. Swelling section average (sec) | |
|---|---|---|---|---|---|---|
|  | Swelling time | | Swelling time (sec) | | 0 second to 30 seconds | 30 seconds to 120 seconds |
|  | 1 hr | 16 hrs | 30 seconds | 120 seconds | | |
| Example 1 | 10.2 | 16.4 | 121 | 292 | 4.03 | 1.90 |
| Example 2 | 9.7 | 14.2 | 110 | 286 | 3.67 | 1.96 |

TABLE 3-continued

| | Content (%) of extractable contents in water having electrical conductivity of 110 μS/cm at 24° C. Swelling time | | Absorbency (g/g) in water having electrical conductivity of 110 μS/cm at 24° C. Swelling time (sec) | | Absorption rate (g/g/sec) in water having electrical conductivity of 110 μS/cm at 24° C. Swelling section average (sec) | |
|---|---|---|---|---|---|---|
| | 1 hr | 16 hrs | 30 seconds | 120 seconds | 0 second to 30 seconds | 30 seconds to 120 seconds |
| Example 3 | 9.9 | 15.8 | 118 | 288 | 3.93 | 1.89 |
| Comparative Example 1 | 16.9 | 26.9 | 47 | 171 | 1.57 | 1.38 |
| Comparative Example 2 | 18.4 | 25.3 | 64 | 183 | 2.13 | 1.32 |
| Comparative Example 3 | 17.9 | 28.6 | 61 | 188 | 2.03 | 1.41 |
| Comparative Example 4 | 15.6 | 28.0 | 58 | 179 | 1.93 | 1.34 |

As can be confirmed in Tables 1 to 3 above, in the case of the super absorbent polymers of Examples in which the change in slip strain according to the degree of swelling was adjusted to be constant, it was confirmed that the super absorbent polymers had excellent absorption performance and permeability, a fast absorption rate, and a predetermined level or lower of an elution amount of extractable contents, and thus, had an excellent balance of physical properties.

The present disclosure provides a super absorbent polymer in which the change in slip strain according to the degree of swelling is adjusted to be constant, so that the absorbency, centrifuge retention capacity, permeability, and absorption rate are excellent.

Although the super absorbent polymer has been described with reference to the specific aspects, it is not limited thereto. Therefore, it will be readily understood by those skilled in the art that various modifications and changes can be made thereto without departing from the spirit and scope of the present disclosure defined by the appended claims.

The invention claimed is:

1. A polyacrylic acid (salt)-based super absorbent polymer having a slip strain (%) of 12.5% or less after the polyacrylic acid (salt)-based super absorbent polymer is subjected to 30% swelling, wherein an absolute value of a rate of change in slip strain at 30% and 70% swelling derived by Equation 1 below is 0.04 or less:

Rate of change in slip strain at 30% and 70% swelling=[{(slip strain at 70% swelling)−(slip strain at 30% swelling)}/40]. [Equation 1]

wherein the slip strain means a value at a time when a storage modulus rapidly decreases with an increase in strain when a change in the storage modulus is observed by increasing the slip strain of each sample from 0.01% to 100% using a rheometer under a frequency of 1 Hz and a temperature of 25° C.

2. The polyacrylic acid (salt)-based super absorbent polymer of claim 1, wherein an absolute value of a rate of change in slip strain at 30% and 50% swelling derived by Equation 2 below is 0.08 or less:

Rate of change in slip strain at 30% and 50% swelling=[{(slip strain at 50% swelling)−(slip strain at 30% swelling)}/20]. [Equation 2]

3. The polyacrylic acid (salt)-based super absorbent polymer of claim 1, wherein an absolute value of a rate of change in slip strain at 50% and 70% swelling derived by Equation 3 below is 0.08 or less:

Rate of change in slip strain at 50% and 70% swelling=[{(slip strain at 70% swelling)−(slip strain at 50% swelling)}/20]. [Equation 3]

4. The polyacrylic acid (salt)-based super absorbent polymer of claim 1, wherein a slip strain (%) value at 30% swelling is 12% or less.

5. The polyacrylic acid (salt)-based super absorbent polymer of claim 1, wherein a slip strain (%) value at 30% swelling is 9.5% or greater.

6. The polyacrylic acid (salt)-based super absorbent polymer of claim 1, wherein slip strain values at 30%, 50%, and 70% swelling all satisfy a range of 9.5% to 12.5%.

7. The polyacrylic acid (salt)-based super absorbent polymer of claim 1, wherein the polyacrylic acid (salt)-based super absorbent polymer has vortex time of 40 seconds or less as measured by a vortex measurement method at 24.0° C.

8. The polyacrylic acid (salt)-based super absorbent polymer of claim 1, wherein the polyacrylic acid (salt)-based super absorbent polymer has permeability of 3 ml/min or greater as calculated by Equation 4 below:

Perm=[20 mL/T1 (second)]×60 seconds [Equation 4]

wherein in Equation 4 above,

Perm is the permeability of the polyacrylic acid (salt)-based super absorbent polymer, and T1 indicates time (seconds) taken for 20 mL of physiological saline to pass through a swollen state of the polyacrylic acid (salt)-based super absorbent polymer under a pressure of 2.07 kPa (0.3 psi) after adding 0.2 g of the polyacrylic acid (salt)-based super absorbent polymer into a cylinder, pouring physiological saline (0.9 wt % sodium chloride aqueous solution) thereinto such that the polyacrylic acid (salt)-based super absorbent polymer is completely submerged, thereby allowing the polyacrylic acid (salt)-based super absorbent polymer to be swollen for 30 minutes.

9. The polyacrylic acid (salt)-based super absorbent polymer of claim 1, wherein when 1 g of the polyacrylic acid (salt)-based super absorbent polymer is free-swollen for 30 seconds with water having an electrical conductivity of 100 μS/cm to 130 μS/cm, the free swell capacity of water containable by the polyacrylic acid (salt)-based super absorbent polymer is 70 g or more.

10. The polyacrylic acid (salt)-based super absorbent polymer of claim 1, wherein when 1 g of the polyacrylic acid (salt)-based super absorbent polymer is free-swollen for 120 seconds with water having an electrical conductivity of 100 μS/cm to 130 μS/cm, the free swell capacity of water containable by the polyacrylic acid (salt)-based super absorbent polymer is 200 g or more.

11. The polyacrylic acid (salt)-based super absorbent polymer of claim 1, wherein when 1 g of the polyacrylic acid (salt)-based super absorbent polymer is free-swollen with water having an electrical conductivity of 100 μS/cm to 130 μS/cm, the average absorption rate from 0 second to 30 seconds is 2.5 g/g/sec or greater.

12. The polyacrylic acid (salt)-based super absorbent polymer of claim 1, wherein when 1 g of the polyacrylic acid (salt)-based super absorbent polymer is free-swollen with water having an electrical conductivity of 100 μS/cm to 130 μS/cm, the average absorption rate from 30 second to 120 seconds is 1.4 g/g/sec or greater.

* * * * *